(12) United States Patent
Ben-Tolila

(10) Patent No.: US 9,900,083 B2
(45) Date of Patent: *Feb. 20, 2018

(54) RADIO REPEATER SYSTEM

(71) Applicant: HiRiseTech Ltd., Petach-Tikva (IL)

(72) Inventor: Itsick Ben-Tolila, Petach-Tikva (IL)

(73) Assignee: HiRiseTech Ltd., Petach-Tikva (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/070,066

(22) Filed: Mar. 15, 2016

(65) Prior Publication Data

US 2016/0197670 A1   Jul. 7, 2016

Related U.S. Application Data

(60) Continuation of application No. 14/551,109, filed on Nov. 24, 2014, now Pat. No. 9,307,562, which is a
(Continued)

(51) Int. Cl.
*H04B 7/14* (2006.01)
*H04B 7/26* (2006.01)
(Continued)

(52) U.S. Cl.
CPC ....... *H04B 7/2606* (2013.01); *H04B 7/15507* (2013.01); *H04Q 9/04* (2013.01);
(Continued)

(58) Field of Classification Search
CPC .............................. H04B 7/26; H04B 7/15507
(Continued)

(56) References Cited

U.S. PATENT DOCUMENTS 4,972,505 A   11/1990  Isberg
6,032,020 A   2/2000   Cook et al.
(Continued)

FOREIGN PATENT DOCUMENTS

EP   0204813   12/1986
EP   0499735   8/1992

OTHER PUBLICATIONS

Notice of Allowance dated Dec. 3, 2015 From the US Patent and Trademark Office Re. U.S. Appl. No. 14/551,109.
(Continued)

*Primary Examiner* — Nay A Maung
*Assistant Examiner* — Angelica M Perez

(57) ABSTRACT

A system and/or method for facilitating wireless communication in an area where it is difficult to transmit and receive signals may use a preexisting wired emergency communication infrastructure to transmit signals between elements of a radio repeater system. Optionally, the system may include synchronization of retransmissions. Analogue and/or digital signals and/or data may optionally be transferred over the preexisting network. Data and/or signals may optionally include audio and/or video signals, digital data, telemetry data, and/or synchronization data. The system may optionally include multiple wireless receivers and/or a voter to select a version of a signal from at least one of the receivers. A network for concurrent repeating of a direct mode simplex wireless signal may optionally include multiple receivers and/or a voter. The simplex network may optionally include a coloring circuit. The power of retransmission and/or the insulation between a receiver and a transmitter may optionally be adjusted.

19 Claims, 14 Drawing Sheets

Related U.S. Application Data division of application No. 13/872,271, filed on Apr. 29, 2013, now Pat. No. 8,923,755.

(60) Provisional application No. 61/639,926, filed on Apr. 29, 2012.

(51) Int. Cl.

| | |
|---|---|
| *H04B 7/155* | (2006.01) |
| *H04W 4/22* | (2009.01) |
| *H04W 76/00* | (2018.01) |
| *H04Q 9/04* | (2006.01) |
| *H04W 4/06* | (2009.01) |
| *H04W 4/14* | (2009.01) |

(52) U.S. Cl.
CPC .............. *H04W 4/06* (2013.01); *H04W 4/14* (2013.01); *H04W 4/22* (2013.01); *H04W 76/007* (2013.01)

(58) Field of Classification Search
USPC ............. 455/11.1, 7, 9, 14, 520, 521, 404.1; 342/357.55
See application file for complete search history.

(56) References Cited

U.S. PATENT DOCUMENTS

| | | | |
|---|---|---|---|
| 6,195,561 | B1 | 2/2001 | Rose |
| 6,298,058 | B1 * | 10/2001 | Maher .................. H04L 12/185 370/390 |
| 6,359,714 | B1 | 3/2002 | Imajo |
| 6,804,529 | B1 | 10/2004 | Barnes et al. |
| 7,203,497 | B2 | 4/2007 | Belcea |
| 7,933,297 | B2 * | 4/2011 | Binder .......................... 370/535 |
| 8,126,510 | B1 | 2/2012 | Samson et al. |
| 8,923,755 | B2 | 12/2014 | Ben-Tolila |
| 2003/0087672 | A1 | 5/2003 | Kattukaran et al. |
| 2004/0258105 | A1 | 12/2004 | Spathas et al. |
| 2005/0176368 | A1 | 8/2005 | Young et al. |
| 2006/0152356 | A1 * | 7/2006 | Yang et al. ................... 340/524 |
| 2006/0250271 | A1 | 11/2006 | Zimmerman |
| 2007/0099667 | A1 | 5/2007 | Graham et al. |
| 2007/0241879 | A1 | 10/2007 | Jobe et al. |
| 2009/0149221 | A1 | 6/2009 | Liu et al. |
| 2009/0190508 | A1 | 7/2009 | Kattwinkel |
| 2010/0068992 | A1 | 3/2010 | Masoian et al. |
| 2010/0197222 | A1 | 8/2010 | Scheucher |
| 2011/0051630 | A1 | 3/2011 | Pennance |
| 2011/0244790 | A1 | 10/2011 | Kwak et al. |
| 2011/0274145 | A1 | 11/2011 | Braz et al. |
| 2013/0288592 | A1 | 10/2013 | Ben-Tolila |
| 2015/0105041 | A1 | 4/2015 | Ben-Tolila |

OTHER PUBLICATIONS

Notice of Allowance dated Sep. 4, 2014 From the US Patent and Trademark Office Re. U.S. Appl. No. 13/872,271.
Official Action dated Sep. 13, 2013 From the US Patent and Trademark Office Re. U.S. Appl. No. 13/872,271.
Official Action dated Aug. 20, 2015 From the US Patent and Trademark Office Re. U.S. Appl. No. 14/551,109.
Official Action dated Mar. 26, 2014 From the US Patent and Trademark Office Re. U.S. Appl. No. 13/872,271.
Dixon "Voter System. An Open-Source/Hardware VOIP-Based Voting Multi-Receiver and Simulcast Transmit System", WB6NTL, 2 P., Jul. 27, 2011.
Gould et al. "Using Synchronized Transmitters for Extended Coverage in FM Broadcasting", Harris Corporation, p. 1-12, 1999.

* cited by examiner

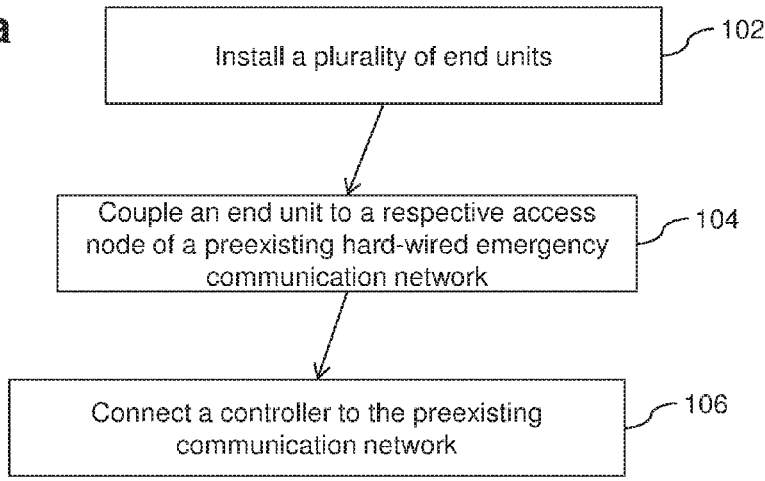
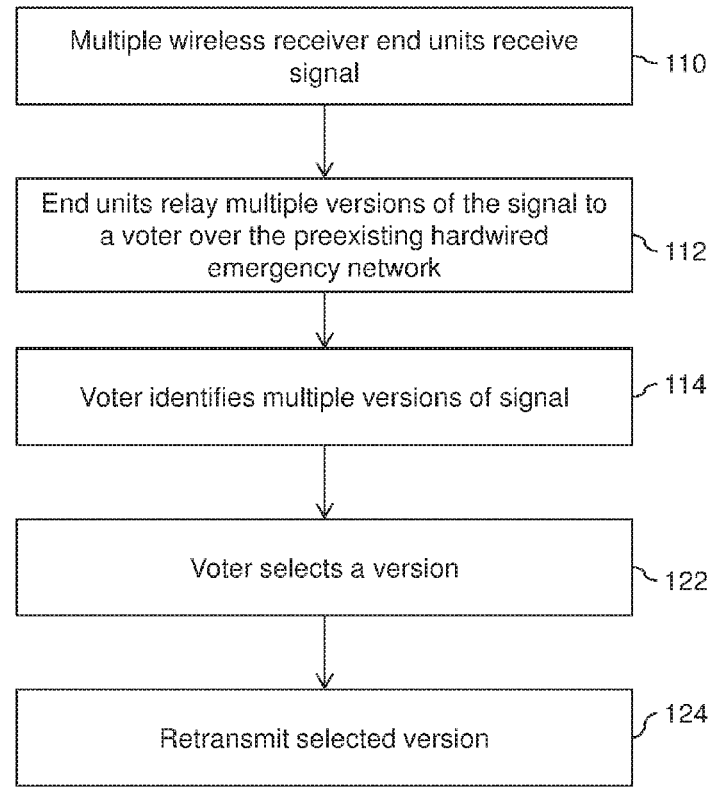

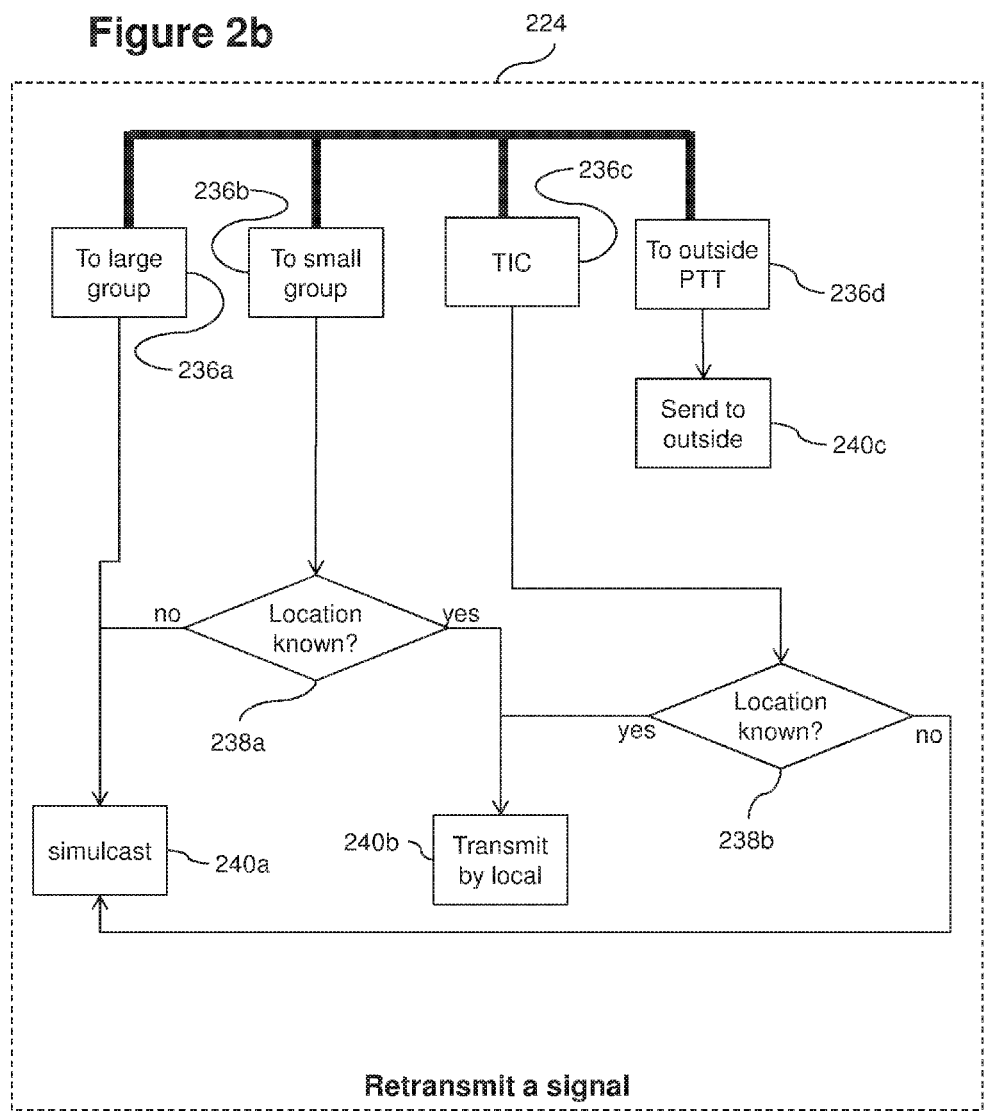

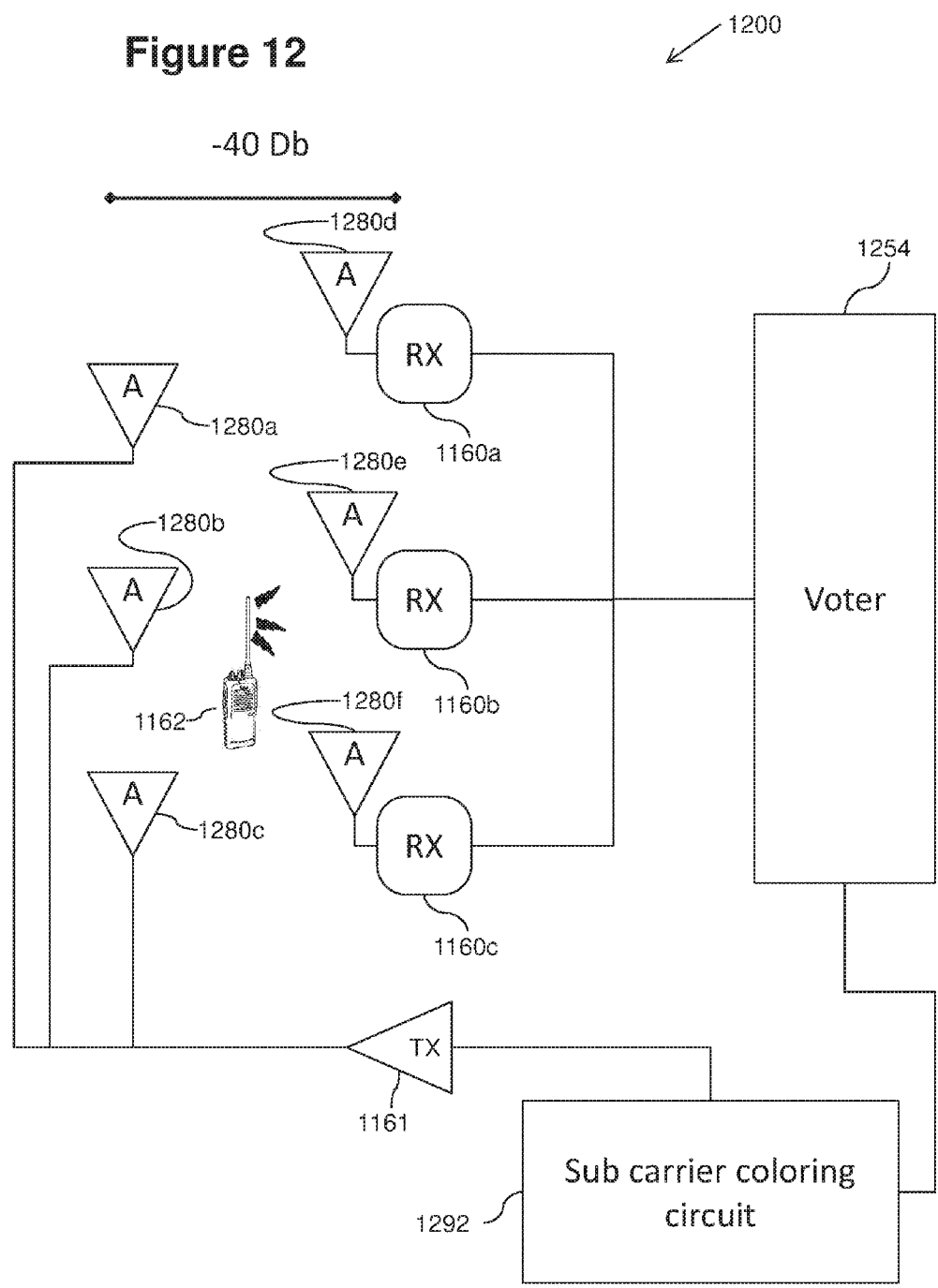

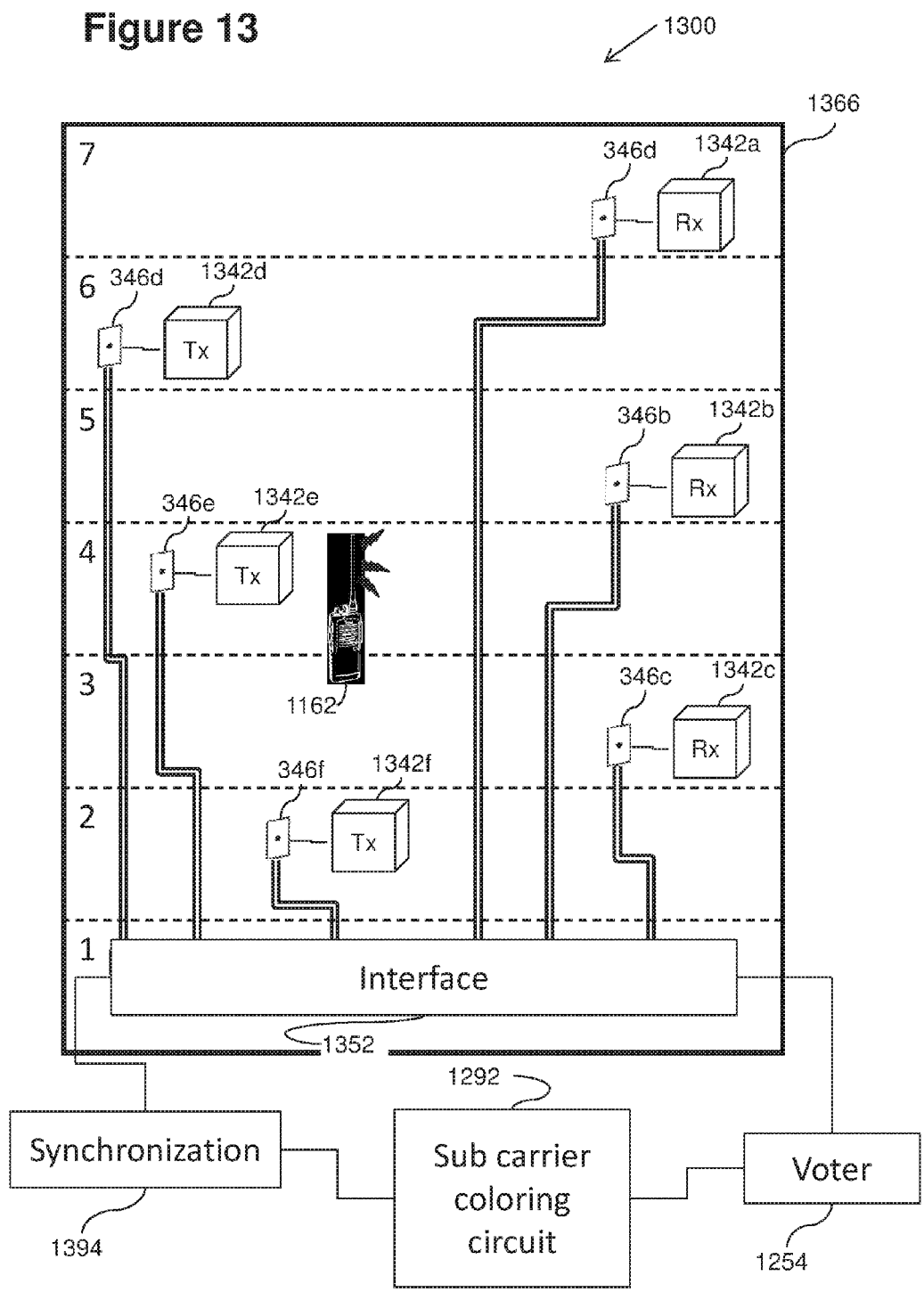

RADIO REPEATER SYSTEM

RELATED APPLICATIONS

This application is a continuation of U.S. patent application Ser. No. 14/551,109 filed on Nov. 24, 2014, which is a division of U.S. patent application Ser. No. 13/872,271 filed on Apr. 29, 2013, now U.S. Pat. No. 8,923,755, which claims the benefit of priority under 35 USC 119(e) of U.S. Provisional Patent Application No. 61/639,926 filed on Apr. 29, 2012. The contents of the above applications are incorporated herein by reference in their entirety.

FIELD AND BACKGROUND OF THE INVENTION

The present invention, in some embodiments thereof, relates to a system and/or method for providing wireless coverage in an area where it is difficult to transmit and receive signals, more particularly, but not exclusively, to a radio repeater system having multiple receivers and a voting mechanism for recognizing multiple versions of a signal and selecting a single version for retransmitting; an aspect of some embodiments of the invention relates to the use of an existing wired emergency communication infrastructure to transmit signals between components of the system and/or the concurrent repeating of a simplex wireless signal.

U.S. Publication No. 2010-0197222 to Scheucher discloses an In-Building Communications system, which permits communication in tunnels, underground parking garages, tall buildings such as skyscrapers, buildings having thick walls of concrete or metal, and/or any building which has communication dead zones due to electromagnetic shielding. The invention includes a portable bi-directional amplifier (BDA) system, an outdoor antenna system attached to the building or independently mountable an indoor antenna system attached to the building or independently mountable inside the building, and a standardized, In-Building Communications (IBC) interface box affixed preferably to the exterior of the building. The interface box communicates with antenna systems attached to the building. The fire department or other emergency response personnel carry portable outdoor and indoor antenna systems and a portable, lithium-ion battery powered, bi-directional amplifier (BDA) system which may be connected to the building during an event such as a fire, earthquake, or an act of terrorism or whenever radio coverage enhancement is required. The portable BDA system is simply connected to the standardized, IBC interface box and powered thus restoring communications within.

U.S. Publication No. 2010-0068992 to Masoian discloses an emergency communications device containing dispatch consoles for use by user that contain multiple repeaters and multiple communication networks. The multiple repeaters and multiple communication networks are used for redundancy purposes, in case the repeater or communication network in use becomes disabled for any reason. The device also contains a recorder unit capable of provided instant playback to emergency dispatch personnel independently of whether the unit is recording. The device does not require an external computer to operate.

U.S. Pat. No. 8,126,510 to Samson discloses a system and method for providing communication between public safety officials. A communications network architecture includes a base transceiver station hub where the base transceiver station hub includes public safety network communications equipment and non-public safety network communications equipment. The architecture also includes a plurality of distributed antenna system (DAS) nodes and the base transceiver station hub is operatively coupled to the plurality of DAS nodes. The method includes providing the public safety communication from the base transceiver station hub to one of a plurality of distributed antenna system (DAS) nodes by public safety network communications equipment included in the base transceiver station hub.

U.S. Publication No. 2007-0099667 to Graham discloses a distributed antenna system for providing distributed signal coverage within a facility of one or more wireless networks transmitting one or more RF signals. The distributed antenna system comprises a wireless base station configured to extend coverage of the one or more wireless networks; a backbone coupled to the base station; a plurality of coupler units connected to the backbone; a first plurality of antennas, each connected to one of the coupler units; a plurality of amplifiers coupled to the backbone; and a second plurality of antennas, each connected to one of the amplifiers. The plurality of amplifiers and the second plurality of antennas actively distribute the one or more RF signals during a powered condition and the first plurality of antennas passively distributes the one or more RF signals during a power failure.

U.S. Pat. No. 6,032,020 to Cook discloses a structure including a plurality of repeaters, each having a primary transceiver and a secondary transceiver electromagnetically located upon a clear side and a blocked side, respectively, of a barrier. Each primary transceiver and secondary transceiver communicates using an intra-repeater signal. Each intra-repeater signal is output from its respective primary transceiver, combined with other intra-repeater signals by a combiner, passed over a communication infrastructure, separated from other intra-repeater signals by a separator, and input to its respective secondary transceiver. Optionally, each intra-repeater signal may be retrieved from the communication infrastructure, separated from other intra-repeater signals by a separator, amplified by a bandpass amplifier, combined with other intra-repeater signals by a combiner, and inserted back into the communication infrastructure U.S. Publication No. 2009-0190508 to Kattwinekel discloses a simplex cognitive 'repeater' for designating one or more transceivers in a cognitive network to perform the repeater function, prescribing one or more lists of distant transceivers being served by repeaters in a distant network, prescribing a set of routing rules for the repeaters, including rules for routing messages received from distant transceivers and rules for routing messages received from the base station or other transceivers in the network, and prescribing a set of rules to enable distant transceivers to participate in the cognitive aspects of the network.

Additional background art includes U.S. Pat. No. 6,195,561, U.S. Publication No. 2011-0051630, U.S. Publication No. 2011-0274145, U.S. Publication No. 2006-0148468, European Patent No. EP0499735, European Patent No. EP0204813, U.S. Publication No. 2005-0176368, U.S. Publication No. 2009-0149221, U.S. Publication No. 2007-0099667, U.S. Pat. No. 4,972,505, U.S. Publication No. 2006-0250271, and U.S. Pat. No. 6,359,714.

SUMMARY OF THE INVENTION

According to an aspect of some embodiments of the present invention there is provided a wireless communication system using a preexisting emergency communication infrastructure. The preexisiting emergency communication infrastructure may include at least one pair of wires. The at least one pair of wires may connect a panel to a plurality of locations. The wireless communication system may include a plurality of end units. At least two of the plurality of end units may include, a wireless receiver, and a communication adaptor connecting the wireless receiver to the at least one pair of wires. The system may also include, a controller including a communication interface communicating with the at least two end units over the at least one pair of wires, and a voter for identifying a plurality of versions of a signal and selecting a version from the plurality of versions. The system may further include a first network transmitter for retransmitting the selected version.

According to some embodiments of the invention, each of the at least two end units may be connected to a separate respective pair of the at least one pair of wires.

According to some embodiments of the invention, the system may further include a redundant connection between at least one of the plurality of end units and the controller.

According to some embodiments of the invention, the redundant connection may include a power grid, a cable communication network, a phone line, an intercom, an existing wireless network, a dedicated wireless network and/or an ad hoc wireless mesh network.

According to some embodiments of the invention, the system may further include a power source supplying power over the at least one pair of wires. At least one of the at least two end units may receive power from the at least one pair of wires.

According to some embodiments of the invention, the at least one end unit receiving power from the at least one pair of wires may further include a battery for powering the wireless receiver, and a charger for charging the battery, the charger electrically connected for receiving the power from the at least one pair of wires.

According to some embodiments of the invention, the first network transmitter and at least one of the at least two wireless receivers may both communicate with the controller over a single pair of the at least one pair of wires.

According to some embodiments of the invention, the system may further include another end unit including the first network transmitter, and another adaptor connecting the first network transmitter to the at least one pair of wires.

According to some embodiments of the invention, the system may further include a second network transmitter synchronizable with the first network transmitter.

According to some embodiments of the invention, the respective wireless receivers of the at least two end units may be designed to receive an emergency band audio signal, a video signal, a Wi-Fi signal, a wireless local area network signal, a trunked mode signal, and/or a Mayday signal.

According to some embodiments of the invention, the system may further include a building including the at least two end units and the preexisting infrastructure.

According to some embodiments of the invention, the system may further include a wireless connection between the first network transmitter and the controller.

According to an aspect of some embodiments of the present invention there may be provided a method of emergency wireless communication using a preexisting emergency communication infrastructure. The preexisiting emergency communication infrastructure may include at least one pair of wires connecting a panel to a plurality of locations. The method may include receiving a signal with a plurality of wireless receivers and relaying a respective version of the signal and corresponding telemetry data from at least one of the plurality of receivers to a controller over the at least one pair of wires. The method may also include recognizing by the controller of a plurality of versions of the signal. The plurality of versions may include the respective version. The method may also include selecting by the controller of a version from the plurality versions based on the corresponding telemetry data, and retransmitting the selected version over an emergency wireless frequency band to at least one portable receiver.

According to some embodiments of the invention, the method may further include relaying the selected version over the at least one pair of wires to a transmitter. The transmitter may perform the retransmitting.

According to some embodiments of the invention, the method may further include relaying the selected version and synchronization data over the at least one pair to at least two transmitters, and wherein the retransmitting includes synchronized transmission by the at least two transmitters.

According to some embodiments of the invention, the method may further include supplying power to at least one of the plurality of receivers over the at least one pair of wires.

According to some embodiments of the invention, the supplying of power may include charging a battery from the power, and powering the at least one receiver from the battery.

According to some embodiments of the invention, the method may further include identifying at least one transmitter in proximity to a portable receiver. The retransmitting may be to the portable receiver and the retransmitting may be over the at least one transmitter only.

According to some embodiments of the invention, the retransmitting may preserve a sender identifier.

According to some embodiments of the invention, the method may further include estimating a location of a source of the signal.

According to some embodiments of the invention, the selecting may be based on a received signal strength indicator, a distortion, a receiver limited voltage, a signal to noise ratio, signal to noise and distortion ratio, and/or a signal delay.

According to an aspect of some embodiments of the present invention there may be provided a method of concurrent repeating of a source signal of direct mode communication on a simplex wireless band employing a repeater network. The repeater network may include a plurality of network receivers, a voter and a network transmitter. The method may include receiving the source signal on the simplex band with the plurality of network receivers. The method may further include recognizing by the voter of multiple versions of the source signal and selecting by the voter of one of the multiple versions. The method may further include retransmitting by the network receiver of the selected version on the simplex band. The retransmitting may be concurrent to the receiving.

According to some embodiments of the invention, the method may further include determining if the source signal is colored and inhibiting the retransmitting when the source signal is colored. The method may further include coloring the selected signal before the retransmitting.

According to some embodiments of the invention, the coloring may include adding a sideband signal.

According to some embodiments of the invention, the method may further include inhibiting the retransmitting in a vicinity of a receiver receiving the selected version from the plurality of network receivers.

According to some embodiments of the invention, the method may further include establishing a retransmitting power such that a reception power of the repeated signal at the network receiver may be less than a source reception power of the source signal at the network receiver and wherein the retransmitting may be at the retransmitting power.

According to some embodiments of the invention, the retransmitting may be at a power level less than a power level of the source signal.

According to some embodiments of the invention, the retransmitting may be by a plurality of network transmitters. The method may further include synchronizing the retransmitting.

According to some embodiments of the invention, the method may further include insulating the network receiver from the retransmission.

According to an aspect of some embodiments of the present invention there is provided a concurrent simplex repeating system of a source signal from a portable transceiver on a direct mode simplex wireless band. The system may include a plurality of wireless receivers on the simplex band and a voter built for identifying a plurality of versions of the source signal and forwarding a selected version of the plurality of versions to a first network transmitter. The system may further include the first network transmitter for retransmitting the forwarded version on the direct mode simplex band. The retransmitting may be concurrent to the receiving.

According to some embodiments of the invention, the system may further include a coloring detector for determining when the source signal is colored, and wherein the retransmitting is inhibited when the source signal is colored, and a signal coloring circuit for coloring the forwarded signal.

According to some embodiments of the invention, the system may further include a second network transmitter, synchronizable to the first network transmitter.

According to some embodiments of the invention, the system may further include a controller configured for inhibiting the second network transmitter from retransmitting the forwarded signal when the second network transmitter is located closer than the first network transmitter to a receiver of the selected version from the plurality of wireless receivers.

According to some embodiments of the invention, the system may further include a controller configured for establishing a retransmitting power such that a reception power of the retransmitted signal at a receiver of the selected version from the plurality of wireless receivers is less than a power of reception of the source signal at the receiver of the selected version.

According to some embodiments of the invention, a transmission power of the first network transmitter may be less than a transmission power of the portable transceiver.

According to some embodiments of the invention, the system may further include insulation producing a signal attenuation of at least 5 Decibels between the first network transmitter and the plurality of wireless receivers.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1a is a flowchart illustrating an exemplary method of installing a radio repeater system;

FIG. 1b is a flowchart illustrating an exemplary method retransmitting a signal;

FIG. 2b is a flowchart illustrating an exemplary method of retransmitting a trunked signal;

FIG. 12 is a block diagram of an exemplary embodiment of a simplex repeater network with signal coloring; and FIG. 13 is a block diagram of an exemplary embodiment of a simplex radio repeater system.

DESCRIPTION OF SPECIFIC EMBODIMENTS OF THE INVENTION

Figure 1C:
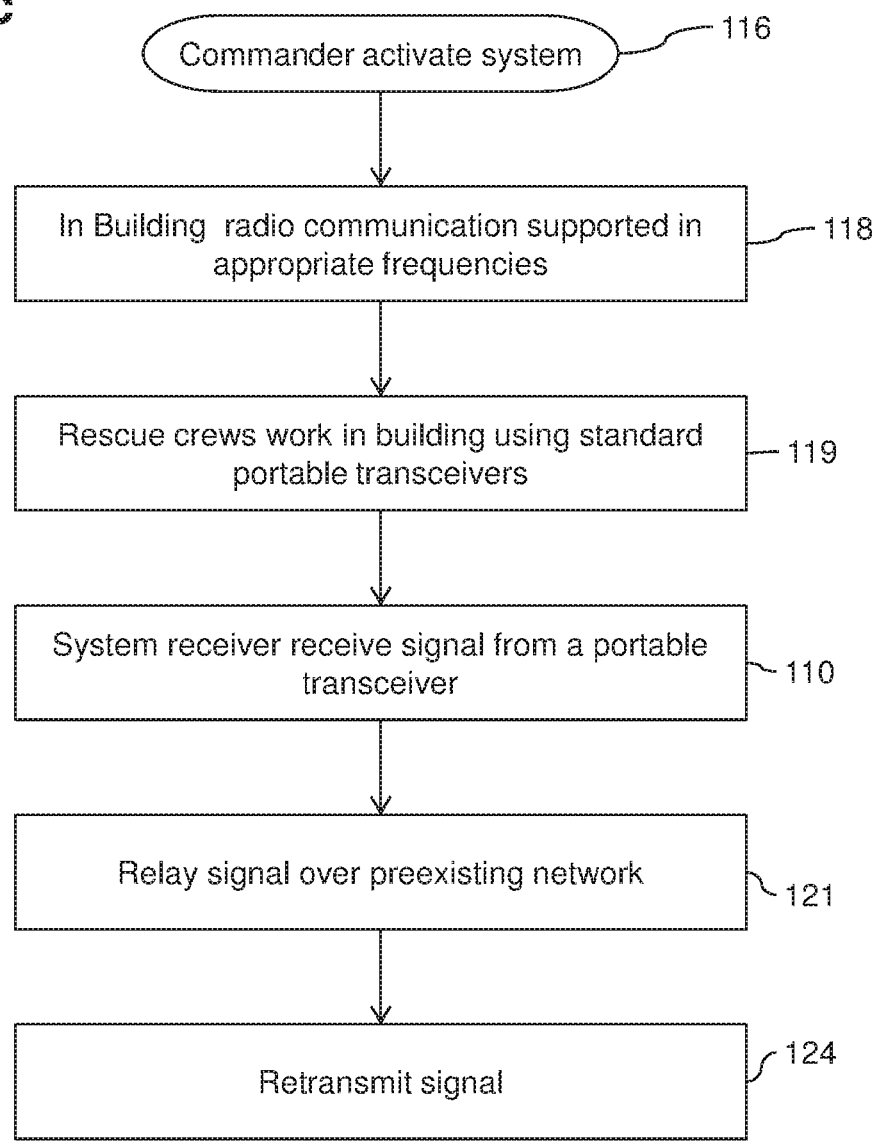
FIG. 1c is a flowchart illustrating an exemplary method of employing a radio repeater system.

The present invention, in some embodiments thereof, relates to a system and/or method for providing wireless coverage in an area where it is difficult to transmit and receive signals, more particularly, but not exclusively, to a radio repeater system having multiple receivers and a voting mechanism for recognizing multiple versions of a signal and selecting a single version for retransmitting; an aspect of some embodiments of the invention relates to the use of an existing wired emergency communication infrastructure to transmit signals between components of the system and/or the concurrent repeating of a simplex wireless signal.

Overview of Exemplary Embodiments

Voting

An aspect of some embodiments of the current invention relates to a radio repeating system having a voting mechanism (a voter). The voter may identify multiple versions of a signal. The voter may further select a single version of the signal for retransmission. In some embodiments, multiple receivers may supply radio coverage to isolated zones. The coverage zones of the receivers may overlap. A single signal transmitted from the overlap region may sometimes be received by more than one receiver. Various factors may cause differences between versions of the signal associated with different receivers. Under some conditions, retransmitting multiple versions of a signal can cause interference. Retransmission of only a single version of the signal may in some instances reduce interference.

In some embodiments, a voter may be included for example in a network hub and/or a network controller. In some embodiments, a voter may include hardware and/or software.

In some embodiments, telemetry data may be used to facilitate voting. Optionally, an end unit may send a version of a signal along with associated telemetry data to the voter.

Use of a Preexisting Wired Emergency Network

An aspect of some embodiments of the current invention relates to the use a preexisting wired emergency network for communication between elements of a radio repeater system. In some jurisdictions, fire codes may regulate wiring used for emergency communication systems. Installation and/or modification of emergency wiring may require specialized personnel and/or inspection. Installation or modification of wiring may add significantly to the cost of an emergency communication system.

Typically, wiring of the preexisting system will conform to existent fire codes. Optionally, use of a preexisting hard-wired emergency system may save on the cost of installing and/or modifying wiring.

In some embodiments of the current invention incoming and/or outgoing signals, telemetry data, and/or synchronization data may be relayed over the wires of the preexisting network. Optionally, a single pair of wires may be used to send one of more of stream of data.

Concurrent Repeating of Direct Mode Simplex Signals

An aspect of some embodiments of the current invention relates to prevention of interference and/or feedback during concurrent repeating of a direct mode signal. Typically, emergency personnel may desire to communicate using existing communications modes and/or existing portable wireless transceivers. For example, emergency personnel may desire to use simplex direct mode real time communication. In some cases, real time repeating of signals on a direct mode simplex channel may lead to interference (for example between the source signal and the retransmitted signal). In some cases, real time repeating of signals on a direct mode simplex channel may lead undesired positive feedback (repeating of the retransmitted signal and/or noise). Real time or concurrent repeating of a signal may mean retransmitting the signal while the source transceiver is still transmitting.

In some embodiments of a radio repeater network, signal coloring may be used to prevent positive feedback of a retransmitted signal. Optionally, the radio repeating system may add coloring to a retransmitted signal. The radio repeating system may, optionally block retransmission of signals containing the coloring. For example, the coloring may include a coded side carrier tone.

In some embodiments of a radio repeater network, a power of retransmitting may be established for avoiding interference. For example, the power of retransmission may be established to be less than the power of the source signal. Optionally, the retransmission power may be less than the source signal after accounting for attenuation between the transmitter and the receiver. For example, the retransmission power may be between on tenth and one hundredth of the source signal transmission power. Alternatively or additionally, the retransmission power may be between a hundredth and a thousandth the power of transmission of the source signal. Alternatively or additionally, the retransmission power may be established so that the power of the retransmitted signal is less than the power of the of the source signal after accounting for signal attenuation. For example, the power of retransmitting may be established so that the power of the attenuated retransmitted signal received by a receiver is between a tenth and a hundredth of the power of the attenuated source signal received by the receiver.

In some embodiments of a radio repeater network, insulation between a retransmission antenna and a receiver antenna may be provided to achieve a desired attenuation of the retransmission signal. For example, the location of the network transmitter may be chosen so that there is an attenuation of 10-80 Db in a signal traveling from the transmitter to the nearest network receiver.

In some embodiments of a radio repeater network, retransmission of a signal may be hindered in the vicinity of a selected receiver. For example, a transmitter in the vicinity of a selected receiver may not retransmit the signal and/or may transmit at a reduced power.

Further Optional Attributes

In some domains interference, obstacles and/or large distances inhibit radio communication between isolated zones. For example, walls, ceilings and/or other obstacles in buildings, tunnels and mines may produce isolated zones from which radio communication is limited. Emergency first responders (fire, police, and emergency medical) depend on uninterrupted radio communication to organize activities and save lives. Isolated zones may interfere with this communication and cost lives. Laws may require providing uninterrupted radio coverage for first responders.

In some embodiments, a radio repeater system may provide radio coverage to a domain including an isolated zone. Optionally, the radio coverage may facilitate emergency 2-way communication to, from and/or within the isolated zone in a manner similar to a Distributed Antenna System (DAS). Optionally, a radio repeating system may include a plurality of end units. Optionally, the end units may include a plurality of wireless receivers for receiving a signal transmitted by a portable transceiver. Optionally, the end units may include at least one wireless transmitter for retransmitting the signal.

Typically, a preexisting network of may include access nodes at various points in the building. Optionally, an end unit of the wireless system may be connected to an access node of the preexisting wired network. Optionally, a signal may be relayed between the end unit and another element of the wireless repeater system over a wire of the preexisting network via the access node. For example, the end unit may include a wireless receiver. Optionally a signal received by the wireless receiver may be over the preexisting wired network for retransmission in another location.

Some preexisting networks may include multiple access nodes and a central panel. For example, the preexisting network may have a star configuration, wherein each access node may be connected to the central panel by one or more pairs of wires.

Some embodiments of a radio repeater system may include a network controller. Optionally, communication in the network and/or operation of the end units may be coordinated by the network controller. Optionally signals may be relayed between the controller and the end units over the preexisting wired emergency network. For example, a plurality of end units may be connected to the preexisting network through access nodes. Optionally, a network controller may be connected to the preexisting network through a central panel of the preexisting network. Optionally, the end units may communicate with the network controller over wires of the preexisting network via the access nodes and the panel.

In some embodiments, a radio repeater system may support communication between existing and/or standard transceivers. For example, a radio repeater system may support tethered and/or untethered communication. For example, a radio repeater system may support analogue communication on emergency channels. A radio repeater system may optionally support trunked communication. A radio repeater system may optionally support simplex and/or duplex communication. A radio repeater system may optionally support interoperability, for example, between different emergency services. A radio repeater system may optionally support communication according to P25 and/or TETRA and/or EADS standards. A radio repeater system may optionally support multichannel communication. A radio repeater system may optionally support signal coloring. A radio repeater system may optionally support time domain multiple access (TDMA) and/or code domain multiple access (CDMA) and or frequency domain multiple access (FDMA). A radio repeater system may optionally support, for example, push to talk (PTT) communication, dispatch PTT, direct (talk around) mode, public grouping, private grouping, private line communication, telephone interconnect (TIC), Wi-Fi, and/or wide band and/or Internet connections. A radio repeater system may optionally include a directional and/or an omni-direction antenna for transmitting and/or receiving wireless signals.

In some embodiments, a radio repeater system may include a plurality of wireless transmitters. Optionally, the plurality of transmitters may simultaneously transmit a selected signal. Optionally, the simultaneous retransmission may be synchronized, (simulcast). Optionally, the selected signal may be sent to a transmitter along with associated synchronization data. The signal and/or the synchronization data may optionally be relayed to a transmitter via a part of a preexisting wired emergency communication network. For example, the synchronization data and/or the signal may be relayed to a transmitter over a single pair of wires associated with an access node of the preexisting network.

In some embodiments, a single end unit may include both a receiver and a transmitter. Optionally both a receiver and a transmitter may be coupled to a single access node of a preexisting network. For example, incoming and/or outgoing signals and/or telemetry data and/or synchronization data and/or other data may be relayed to and from the receiver and/or the transmitter via a single pair of wires from the preexisting network.

In some embodiments, an end unit may receive power over a portion of a preexisting wired emergency network. For example, an AC and/or DC voltage potential may be applied across a pair of wires associated with an access node of the existing network. Optionally, an end unit of the radio repeater system may receive power from the access node. In some embodiments, the end unit may include a battery. For example, the power received from the pair of wires may be used to charge the battery. Alternatively or additionally, the end unit and/or a component of the end unit may be directly powered from the pair of wires. Optionally, the end unit may use a single pair of wires for power and/or relaying signals and/or for digital and/or analogue communication.

In some embodiments, a radio repeater system may relay analogue and/or digital signals and/or analogue and/or digital data over a preexisting wired network. Signals may include, for example, audio signals and/or video signals and/or identification signals and/or distress signals and/or location signals. Data may include, for example, telemetry data, synchronization data, trunking data, packet data, identification data, timing data, scheduling data, compression data, and/or error control data. Optionally, the retransmitted signal may preserve and/or modify parts of the original signal header and/or footer. For example, the retransmitted signal may include identification information from the original signal. For example, identification information may include Technical Public System Key (TPKS) data.

In some embodiments of a radio repeater system, signals may be relayed over an existing network that conforms to historical fire code standards. For example, the existing network may conform to NFPA 70 standards. Alternatively or additionally, the wired systems may include an EVAX emergency evacuation system, for example an EVAX 25 and/or an EVAX 50 available from EVAX systems 20 McDermott Road, Branford, Conn. 06405.

In some embodiments, an end unit of a radio repeater system may be fixed and/or portable. In some embodiments, a central hub of a radio repeater system may include portable components. In some embodiments, a preexisting network may include a reversible connector, for example a phone jack. Optionally, a portable unit may optionally include a reversible connector, for example a plug to plug-into the phone jack of the preexisting network.

Exemplary Embodiments

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Installing a Radio Repeater System Over a Preexisting Hard-Wired Network

FIG. 1a is a flow chart illustrating an exemplary embodiment of a method for installing a radio repeater system using a preexisting hard-wired emergency communication network.

In some embodiments, a plurality of end units may be installed 102 in a building. An end unit may optionally provide radio coverage to an area within the building.

In some cases, a major cost of installing a radio repeater system is the installation of a communication backbone for relaying signals between elements. In some cases, this expense is increased due to the need to shield the backbone and/or make the backbone fire resistant.

In some cases, use of a preexisting network to interconnect elements of a radio repeater system may save considerable money. Typically, wiring of the preexisting emergency network may already be shielded and/or fire resistant.

In some embodiments, an end unit may be coupled 104 to an access node of the preexisting hard-wired network. For example, an access node of the hard-wired network may include a phone jack connected by a pair of Copper wires to a central panel. Optionally, the end unit may be coupled 104 to the access node through an adapter. Optionally, the end unit may communicate over a pair of wires associated with the access node. Optionally, an end unit may be reversibly coupled 104 to the preexisting network (for example, a mobile repeater may be coupled to the preexisting network by means of a removable phone jack). Alternatively or additionally, an end unit may be installed permanently (for example a repeater may be mounted to a ceiling. Optionally, wires coupling 104 the repeater to the preexisting network may be sunk into the wall and/or soldered).

In some embodiments, a network controller may be connected 106 to an end unit via the preexisting communication network. For example, the controller may include a communication interface. The communication interface may optionally be connected 106 to a panel of the preexisting network. Optionally, the controller may receive signals from and/or send signals to one or more of the end units over the network. The controller may optionally coordinate the functioning of the end units. In some embodiments, the controller may be part of a communication hub. Alternatively or additionally, the communication interface may be connected 106 through an access node of the preexisting system. Alternatively or additionally, the controller may be connected 106 through a wireless connection and/or an optical fiber to the communication interface.

Operation of a Radio Repeater System

FIG. 1c is an exemplary flow chart illustrating use of a radio repeater system to facilitate emergency communication in a building. When there is an emergency event (for example a fire or a terrorist attack), a rescue team commander optionally activates 116 a command communication hub (Commander Terminal). The hub may, for example, be in the lobby of a building. From that moment, the whole building will optionally be covered 118 in the appropriate RF frequencies. Alternatively or additionally, the radio repeater system may remain activated also when there is not emergency event. A rescue crew may for example continue to work 119 with their standard portable radios on the relevant channels. Optionally communication will be on a conventional duplex repeated mode for example channels 11 and/or 12. Alternatively or additionally, a radio repeater system may be used to facilitate trunked mode communication and/or direct mode simplex communication (for example, as explained herein below).

In some embodiments, a radio repeater system may simultaneously cover multiple frequency bands. For instance, different emergency services (emergency medical [EMT], homeland security, police, fire etc.) may be involved in a single event. Each service may use a different frequency for communication. Optionally a radio repeater system may repeat a signal in the same band in which it was transmitted and/or in one or more other bands. Optionally, a radio repeater system may facilitate interoperability. For example, the radio repeater system may rebroadcast received EMT signals both on the EMT band and also on a fire fighter band.

In some embodiments, the portable signals in the building may be repeated by the radio repeater system. For example, a signal may be received 110 by a radio repeater system receiver in the building and relayed 121 over a preexisting emergency network in the building. Optionally, the signal may be relayed 121 to a controller and/or a communication hub and/or a transmitter over the preexisting network. In some embodiments, the signal will be retransmitted 124 by one or more transmitters to another portable transceiver inside and/or outside the building.

FIG. 1b is a more detailed flow chart of an example of operation of a radio repeater system. In the example, a portable transceiver in an isolated area of a building communicates with elements inside and/or outside of the isolated area.

For example, in a high-rise building, each floor may be partially or totally isolated from an adjacent and/or far away floor. A first responder may be using a portable transceiver to communicate with another first responder on the same floor and/or on an adjacent floor and/or on a far away floor. A single floor may include zones that are isolated from each other. Sometimes, a zone on a particular floor that is isolated from another zone on the same floor will be in radio contact with a zone on another floor.

Optionally, a signal from the portable transceiver may be received 110 by a plurality of end unit receivers located in the vicinity of the portable transceiver. For, example the signal may be received by end units on the same floor as the portable transceiver and also by end units on adjacent and/or nearby floors. Optionally, the end units may relay 112 respective versions of the signal over the preexisting hard-wired emergency network to a controller. Optionally, the controller may include a voter. The voter may optionally identify 114 multiple versions of a single signal. The voter may optionally select 122 a version of the signal. The selected version may optionally be retransmitted 124.

Communicating from a Portable Unit in a Building

Figure 2A:
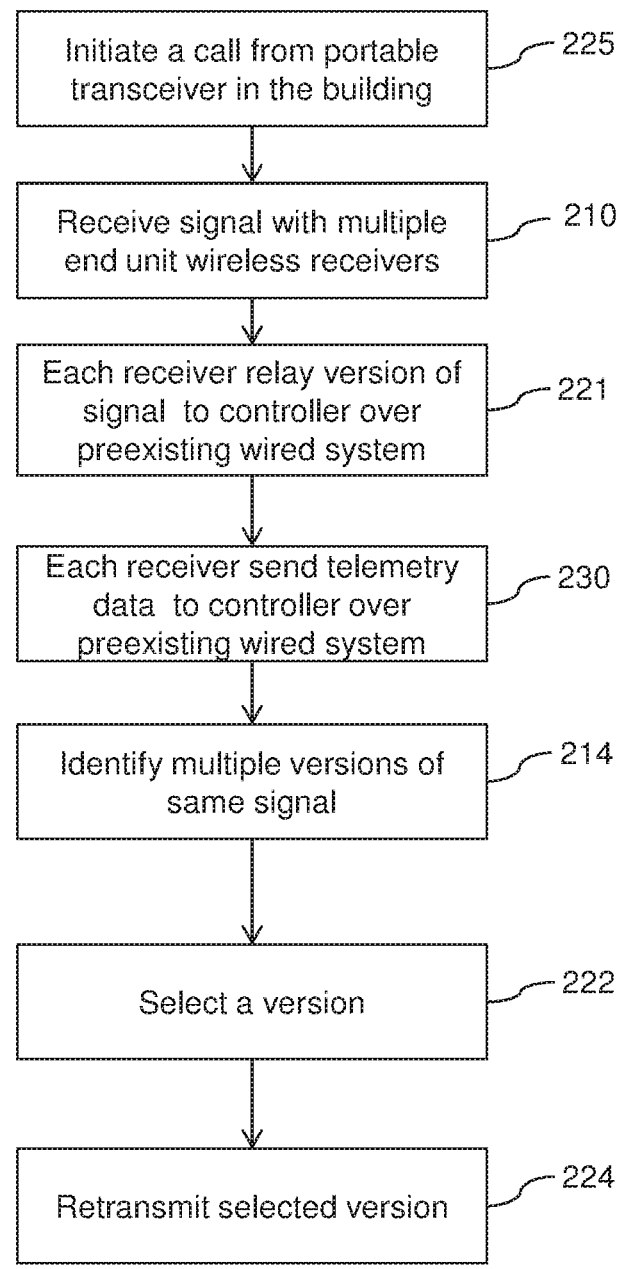
FIG. 2a is a flowchart illustrating an exemplary method of employing a radio repeater system showing additional features.

FIGS. 2a and 2b illustrate an exemplary embodiment of a method of communicating from within a building over a radio repeater system including a preexisting wired communication network.

In some cases, the preexisting network may have originally been configured to support non-standard location specific communication modes and/or equipment. Typically, first responders would prefer to communicate with standard equipment used in other settings. When location specific equipment is required, faults that develop during installation or storage may be revealed only at the time of an emergency. For example—a device may not be ready for use when needed, a necessary device may not be readily available, and/or the team may not be properly practiced and/or trained to work with the specialized equipment etc.

Some embodiments of the current invention support standard modes of communication using standard first responder equipment and a preexisting wired network.

In the example of FIG. 2a, a preexisting wired network is configured for communication via wired telephone handsets and a first responder prefers to employ a standard issue P25 compliant portable radio transceiver. Optionally, the transceiver and the radio repeater system employ truncated duplex (repeated mode) radio communication. In trunked mode, traffic may be assigned to one or more voice channels, for example by a repeater or a base station. Optionally, a controller of a radio repeater system may assign channels (for example, by CDMA and/or TDMA and/or by FDMA). Alternatively and or additionally, a radio repeater system may be part of a larger network and channels may be assigned by the area dispatcher and/or base station.

Alternatively or additionally as will be described in part in examples below, a radio repeater system and/or a portable transceiver may support other modes. For example, a P25 compliant transceiver may support a direct simplex "talk around" mode wherein two portable radios may communicate without intervening equipment. Optionally, P25 compliant equipment may support a conventional mode wherein two radios communicate through a duplex repeater or base station without trunking. Optionally, a radio repeater system and/or a portable transmitter may support one, some or all of the above modes.

In the example of FIG. 2a, a first responder in the building initiates 225 a call using a P25 standard portable transceiver on a truncated channel. In some cases, a call may be received 210 by multiple receiver end units having overlapping reception zones.

In some embodiments, a retransmitted signal may preserve part and/or all of the header and/or footer and/or identification information of the original signal. For example, a portable transducer of a first responder may automatically send identification information. For example, the identification information may be in the form of a TPKS sent upon pushing of a talk key on a PTT transceiver. The identification information may be repeatedly transmitted upon activation of a mayday switch. Some equipment may include automatic recognition of these signals. For example, a dispatcher station may recognize this information and use it for tracking personnel. In some cases, tracking may be important. For example when a mayday signal is sent, this tracking may save lives. Optionally, a radio repeater system may preserve these aspects of a signal.

In some embodiments, each receiver may relay 221 the version of the signal that it receives along the preexisting network to a controller. Optionally, each receiver may also send 230 telemetry data to the controller. Telemetry data may include for example signal level, received signal strength indicator (RSSI), distortion, receiver limited voltage, signal to noise ratio (SNR), signal to noise and distortion (SINAD) ratio, timing data (for example the signal delay) and/or other known information. Optionally, a receiver may use single medium (for example a single pair of wires) to relay 221 a signal and to send 230 telemetry data to a controller. Optionally other data may also be sent over the same medium. For example, different data may be sent on separate channels (for example different frequency carriers on the same medium) or in separate packets or by other methodologies.

In some embodiments, when the controller receives data from two different receivers, the controller may identify 214 different versions of the same signal. Optionally identification 214 of multiple versions of a signal may be based on one or more tests, for example telemetry data and/or on timing and/or on identification information sent by the portable transceiver and/or by statistical means.

In some embodiments, the controller will select 222 a single version of a signal. Selection may be based, for example, on the telemetry data, (for example, the strongest signal and/or the highest signal to noise ratio may be selected and/or an earlier signal may be selected and/or selection may be based on a combination of factors). Optionally, the selected signal will be retransmitted 224.

Retransmitting a Signal

FIG. 2b illustrates an exemplary embodiment of a method of retransmitting 224 a signal. A signal may be retransmitted 224 by a single network transmitter and/or multiple transmitters. Sometimes a single transmitter will not provide proper radio to multiple zones isolated from one another. Optionally, multiple transmitters may simultaneously retransmit 224 a signal to multiple zones. Simultaneous non-coherent transmissions may sometimes interfere with one another. Optionally, multiple transmitters may be configured to reduce retransmission interference.

For example, a signal may be directed to a large group 236a of portable receivers in located in multiple zones. Examples of signals directed to large groups include untrunked communications to all receivers on a channel and/or a public call to all receivers on a channel in a trunked network and/or a call to a large talk group.

In some embodiments, a call to a large group 236a may be transmitted simultaneously by multiple transmitters (simulcast retransmission 240a). For example, multiple transmitters may cover a large area and/or multiple locations separated by barriers that cause signal attenuation. In some embodiments, the coverage areas of different transmitters may overlap. Optionally, transmitters having overlapping coverage may be synchronized. Synchronized, coherent retransmission may for example include matching timing, phase, frequency and/or modulation sensitivity of retransmissions of a plurality of receivers. Alternatively or additionally, a single transmitter may be used to retransmit a signal to a large group 236a. For example, there may be a large network transmitter with enough power to cover an entire building.

In some embodiments, a signal may be directed to a small group 236b of transceivers. For example, on a trunked network, a call may be directed to single push to talk (PTT) transceiver or to a small group inside the building. When the location of the target is known 238a then, in some embodiments, the signal may be transmitted in a portion of the network only. For example, local retransmission 240b may be transmitted by only a portion of the network covering of the target transceiver. For example, the location of the target transceiver may be inferred via voting as described above. In some instance, local retransmission may reduce depletion of network resources.

In some embodiments, a more precise estimate may be made of the location of a portable transceiver, for example by triangulation. Optionally the distance of a transceiver from various wireless receivers may be estimated based on signal delay, signal strength, signal to noise ratio and/or building specific knowledge of how signals propagate.

In some embodiments, when the location of the target transceiver is not known 238b, the signal will be retransmitted 240a over the whole area. For example, retransmitting 240a over the whole area may be similar to the case of a signal for all receivers as described above. Alternatively or additionally, in some embodiments, signals may be retransmitted over the entire network regardless of the target.

Some portable transceivers are capable of Telephone Interconnect calls TIC 236c (simultaneous talking and listening). Such calls generally use more bandwidth than simple PTT calls (for example, each transceiver constantly use simultaneously two bands, one to talk and one to receive). Transmitting a TIC call over a large network may tie up a large quantity of valuable network resources. Optionally, a TIC transceiver may be tracked by the voting results of its transmissions. When the location of a TIC transceiver is known 238b, the received band may be retransmitted 240b by a local receiver only. Alternatively or additionally, some networks may not support local retransmissions and/or the location of the transceiver may not be known 238b. In some embodiments, a TIC retransmission 240a may be over the entire network.

In some cases, a transceiver in the network may make a call 236d to an outside network, for example to a telephone and/or a cellular phone. An external call 236d may be retransmitted 240c to the outside network.

Figure 3:
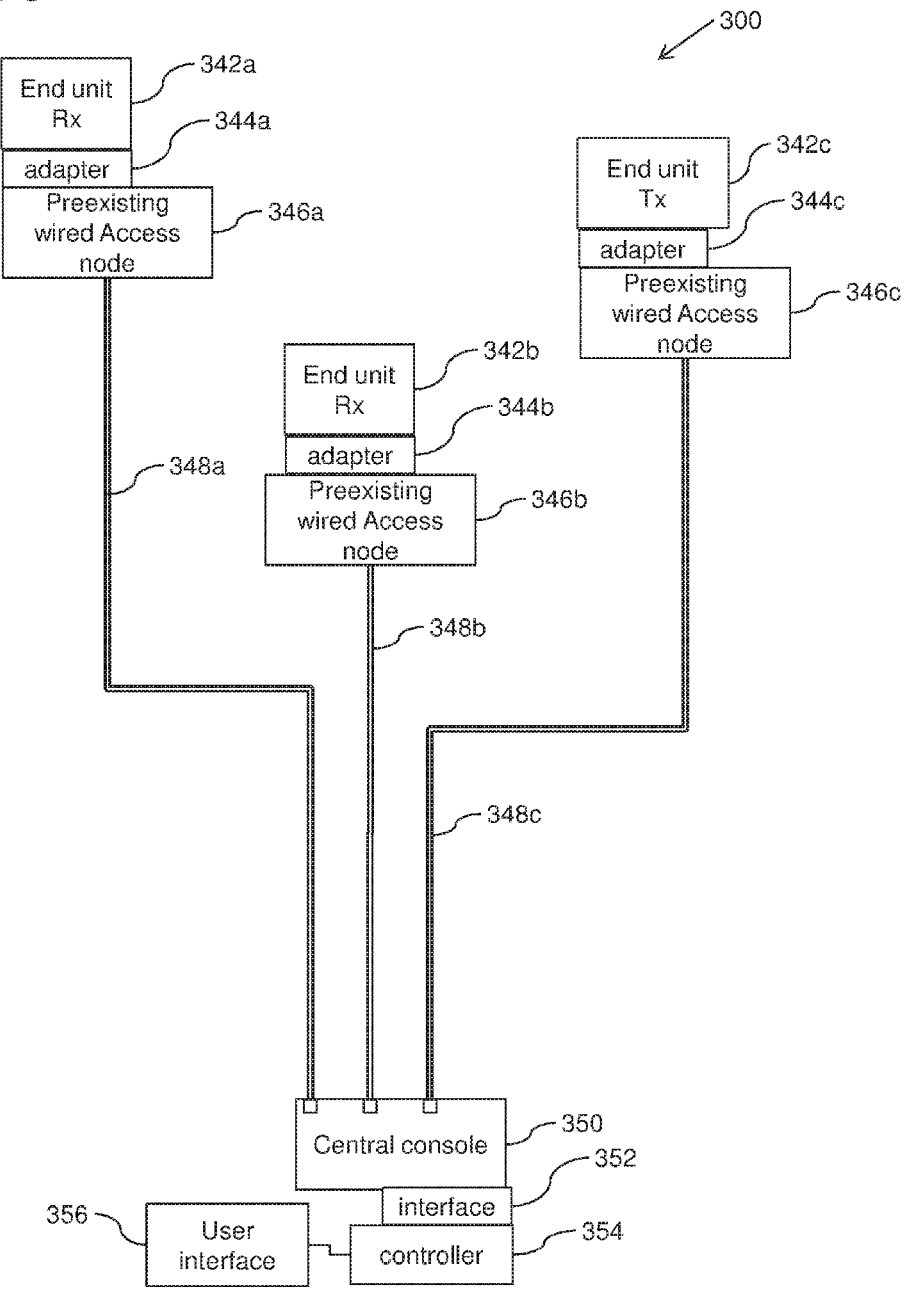
FIG. 3 is a block diagram of an exemplary embodiment of a radio repeater system.
Figure 4:
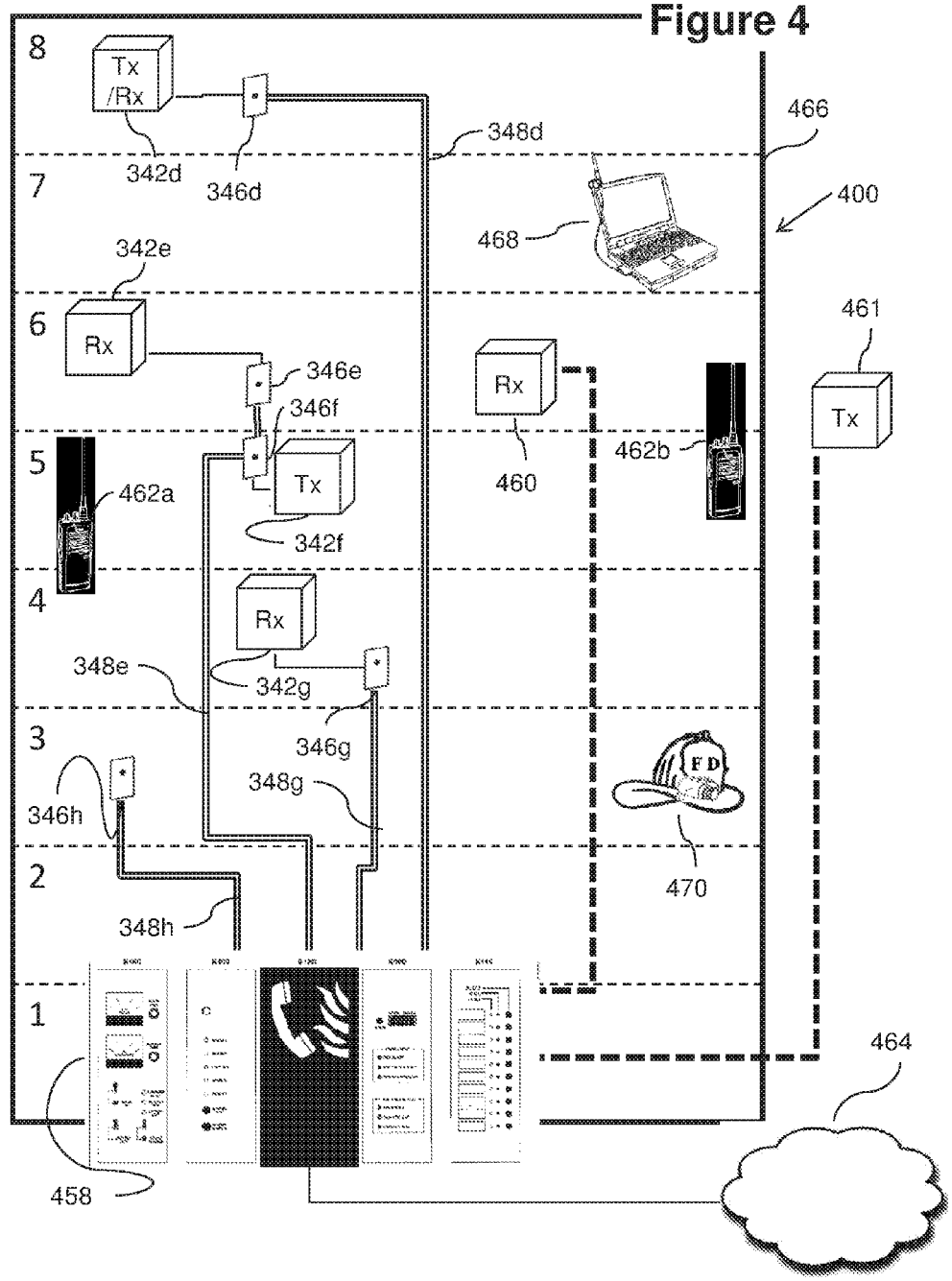
FIG. 4 is a block diagram of an exemplary embodiment of a radio repeater system showing additional features.

Exemplary Embodiment of an in Building Radio Repeater System Using an Existing Hard-wired Network Installing a new hard-wired emergency network and/or modifying the wiring of an existing emergency network may require expensive licensed installation and inspection of shielded and/or fire resistant components. FIGS. 3 and 4 illustrate exemplary embodiments 300 and 400 of radio repeater systems employing a preexisting wired emergency network with minimal or no modification or addition to the existing wiring.

Many high-rise buildings include a preexisting hard-wired emergency communication network. For example, the preexisting hard-wired emergency network may include access nodes (typically phone jacks) spread around the building and connected to a central panel by a star network of pairs of twisted wires. The existing network will typically be fire resistant according to building standards in effect at the time that the network was installed.

Typically, a controller will be connected to the preexisting network by an interface in place of the panel of preexisting network. Optionally, the controller may communicate with end units located at the access nodes of the preexisting network via wires of the preexisting network. Optionally, the end units will include wireless transmitters and/or receivers supporting wireless communication in various areas of the building.

For example, the preexisting wired emergency network of embodiment 300 includes three wired access nodes 346a, 346b and 346c. Access nodes 346a-c may include, for example, phone jacks spread around the building for emergency access to rescue personnel. For example, many buildings include an emergency phone jack on each floor. Often the phone jacks are located near the elevator shaft. Typically, each access node is connected to a central panel 350 of the preexisting network by a respective pair of twisted wires 348a, 348b and 348c.

Figure 7:
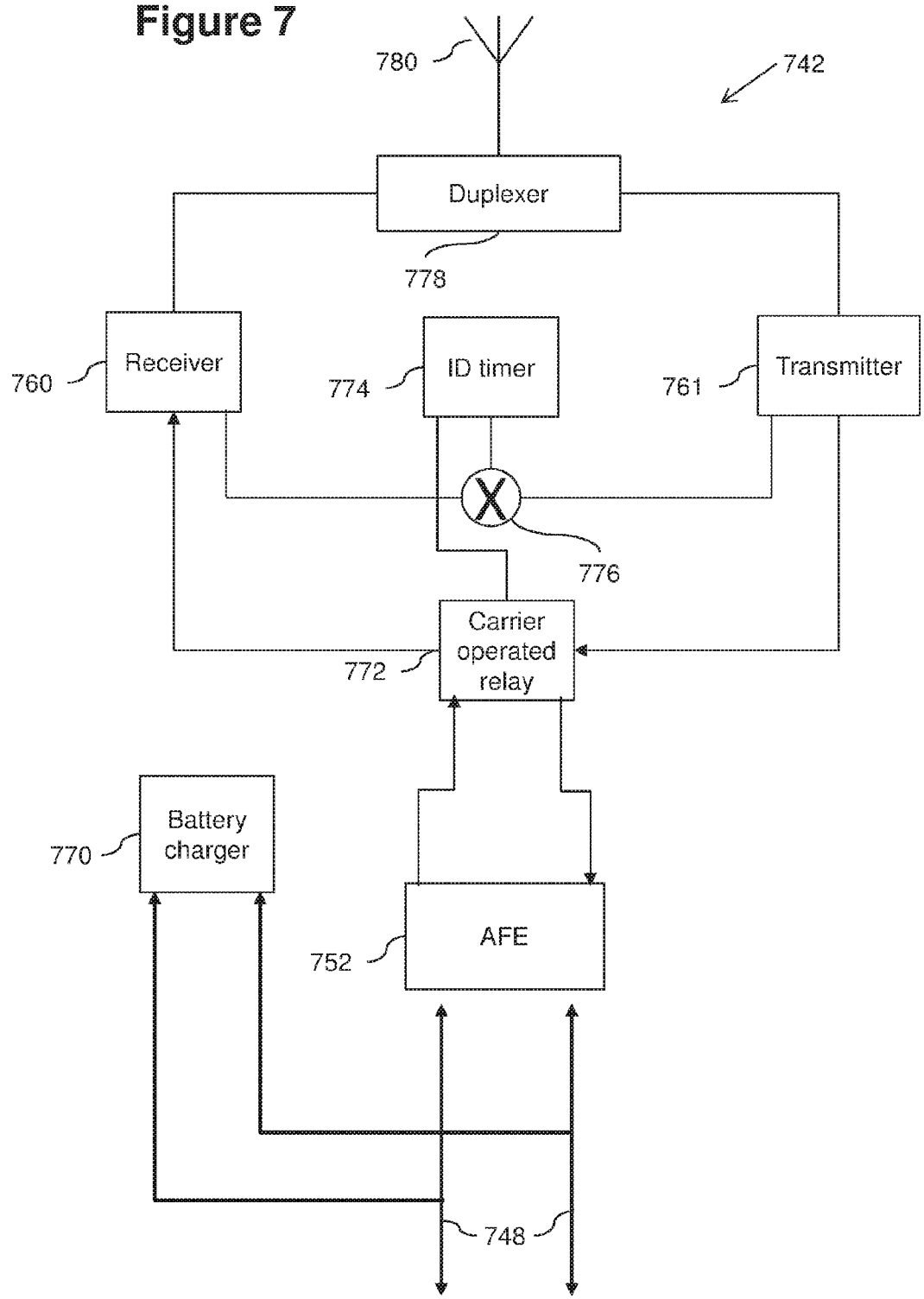
FIG. 7 is a block diagram of an exemplary embodiment of an end unit.

In some embodiments of a radio repeater system, end units will be connected to some or all of the preexisting wired access nodes. In the example of FIG. 3, three end units 342a, 342b and 342c are shown. Two end units 342a and 342b include wireless receivers. A third end unit 342c includes a wireless transmitter. Optionally, each end unit 342a-c includes a respective adapter 344a, 344b, and 344c for connecting to a respective access node 346a-c. Optionally, an adapter 344a-c may be connected reversible or permanently to the respective access node 346a-c. For example, an adapter may be permanently soldiered to the access node and/or the adapter may include a phone plug for reversible connection to the access node. Optionally, an adapter may include an analogue front end (AFE) for converting radio signals into signals transmittable over twisted pairs of wires 348a-c. Optionally, some or all adapters 342a-c may include a power adapter to harvest power from the preexisting network and supply power to a respective end unit 342a-c. A more detailed example of an adapter is illustrated in FIG. 7.

Figure 8:
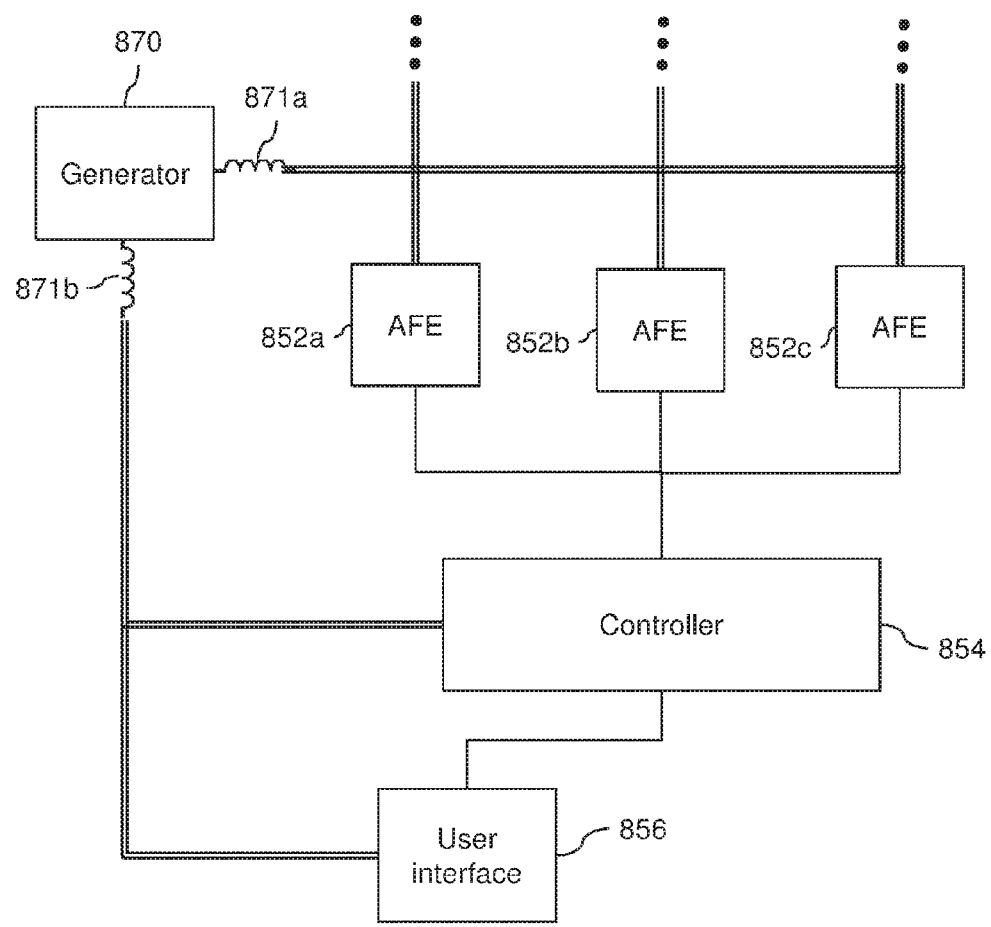
FIG. 8 is a block diagram of an exemplary embodiment of a communication hub.

In the example of FIG. 3, the electronics of preexisting central panel 350 are removed and replaced with an interface 352 connecting a wireless network controller 354 to pairs of wires 348a-c. An example of an interface is illustrated in FIG. 8. Interface 352 connects a network controller 354 through the preexisting wired system to end units 342a-c. Optionally, the network controller may be connected to a user interface 356. For example, a chief of operations may supervise emergency personnel via user interface 356.

Typically, the network of FIG. 3 may be used by first responders to communicate inside a building. For example, a first responder in the building will make a call on his portable transceiver. The signal may, for example, be picked up by the receivers of end units 342a,b. Each receiver may optionally transfer a respective version of the signal over adapters 344a,b. In the example, the two versions of the signals may be transferred through access nodes 346a,b to pairs of wires 348a,b. The two versions of the signal may for example continue to travel over wires 348a,b to panel 350 and through interface 352 to network controller 354. Network controller 354 optionally selects (voting) a single version of the signal. The selected versions may optionally be relayed across wires 348c to the transmitter of end unit 342c. The transmitter may optionally transmit the signal to other portable wireless transceivers located in the building.

In some embodiments, a chief of operations may also receive and sends signals via user interface 356. Optionally, user interface 356 may include a control panel and/or a wired and/or wireless connection to a remote dispatcher station. Optionally, interface 352 may also connect a power source, for example an emergency generator, a municipal power supply and/or a battery to the preexisting network. The power supply may for example supply power to end units 342a-c.

FIG. 4 is schematic illustration of another exemplary embodiment 400 of a radio repeater system using a preexisting hard-wired emergency communications network. Embodiment 400 is similar to embodiment 300 with some additional features. Among the additional features, embodiment 400 includes an end unit 342d including both a network receiver and network transmitter, a network transmitter 461 that is part of the radio repeater system but is not connected via the preexisting network, a network receiver 460 that is part of the radio repeater system but is not connected via the preexisting network, a connection to an external network 464, an access node 346h of the preexisting wired network not in use by the radio repeater system and a plurality of end units 342e and 342f connected to a single pair of wires 348e via multiple access nodes 346e and 346f.

Exemplary embodiment 400 includes an eights story building 466 having a preexisting hard-wired emergency communication network. In the example, the preexisting wired network includes five access nodes 346d-h connected to four pairs of twisted wires 348d,e,g,h. The panel of the existing network has been replaced by an optional central hub 458 of the radio repeater system. Optionally central hub 458 includes a user interface, a controller, a voter and adapters for communicating over wire pairs 348d,e,g,h.

In exemplary embodiment 400, the radio repeater system includes four end units 342d-g each end unit includes an optional adapter for connection to a respective pair of wires. For example, end unit 342d includes a wireless network repeater (transceiver), end units 342e,g include a wireless network receivers, end unit 342f includes a wireless network transmitter. Hub 458 is additionally connected via a wireless connection to a wireless network receiver 460 and transmitter 461. Wireless receiver 460 is located inside building 466. Wireless transmitter 461 is located outside building 466.

In some embodiments, a single end unit may have more than one connection to the central hub. Optionally, multiple connections may supply backup redundancy. Redundancy may preserve the network when a single component fails. For example, an end unit may be capable of using a backup wireless connection when the wired connection is damaged (for example by a fire). For example, an end unit may be connected to the hub via a wide band unshielded optical cable and also have a redundant emergency connection via a shielded pair of wires and/or an electrical grid and/or a wireless connection.

Two portable transceivers 462a and 462b are shown using the network. The radio repeater system of embodiment 400 is also optionally capable of delivering Wi-Fi connections for wireless devices. In exemplary embodiment 400, a portable computer 468 and a helmet mounted wireless video camera 470 communicate via the radio repeater system. Optionally, the location of camera 470 may be estimated based on voting of the video signal and/or voting of audio signals from the helmet's owner and/or by triangulation. Optionally, addition sensors (for example smoke detectors, heat detectors, radiation detectors) may be placed around the building and/or carried by emergency personnel; the sensors may optionally send data to appropriate personnel over the radio repeater network. Optionally, sensor data may be transmitted over the radio repeater system. For example, sensor data may include the status of emergency personnel in the building, for example heart rate, amount of oxygen remaining etc.

In some embodiments, digital and/or analogue data may be transferred along a single pair of wires. For example, wire pair 348d may carry audio signals (analogue or digital) from portable transceiver 462a. They may carry telemetry data and/or digital video from camera 470 and/or data to and from computer 468 and/or synchronization data and/or audio signals for retransmission and/or data signals for retransmission. Optionally, multiple signals may be sent over a single pair of wires by time domain multiplexing TDM or frequency domain multiplexing FDM or other methods.

Synchronized Retransmission

Figure 5:
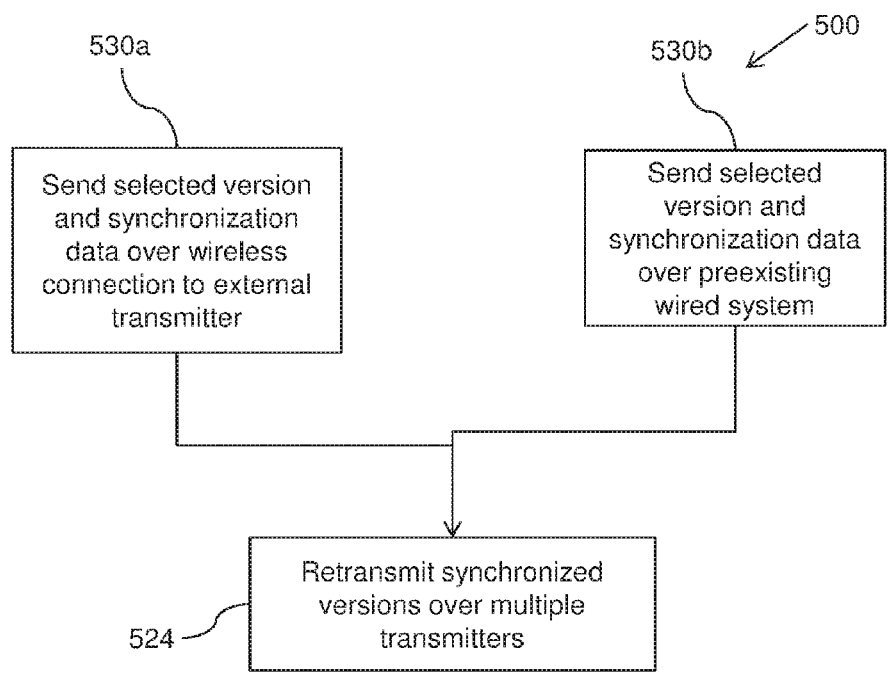
FIG. 5 is a flow chart illustrating an exemplary embodiment of synchronized retransmission of a signal.

FIG. 5 illustrates schematically an exemplary embodiment 500 of a method of synchronized retransmission by multiple transmitters. Multiple transmitters may be used, for example, to achieve reliable radio coverage of areas separated by obstacles that cause radio attenuation. Sometimes the coverage zones of the transmitters will overlap. Broadcasting from two transmitters on the same frequency can lead to serious reception problems in the overlap areas. Optionally, during retransmission of a signal, multiple transmitters may be synchronized. In some cases, synchronization may improve reception in overlap areas.

In some embodiments, synchronization data may be sent 530b to end units over the preexisting wired network and/or synchronization data may be sent 530a via another channel (for example wirelessly). Synchronization data may include, for example, data on timing, phase, frequency and/or modulation sensitivity. Multiple transmitters may retransmit 524 coherent and/or synchronized signals based on the synchronization data.

Supplying Power to End Units Over the Preexisting Network

Under emergency conditions, power failures may occur. Laws in some jurisdictions require emergency communications systems to include blackout resistant power supplies. Laws may further require that power supplies be shielded or fire resistant. Installation or modification of emergency wiring may entail high costs.

Figure 6:
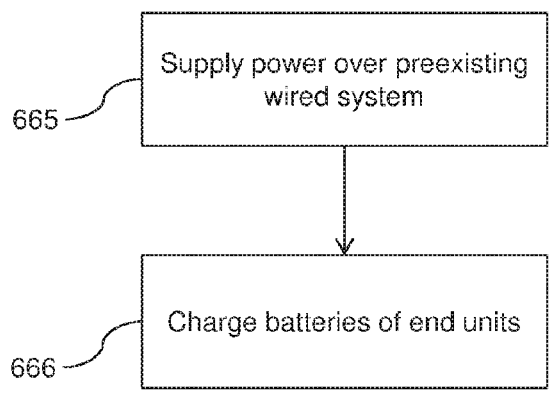
FIG. 6 is a flow chart illustrating an exemplary embodiment of charging a battery of an end unit of a radio repeater system.

FIG. 6 illustrates an exemplary method of supplying power to end units over a preexisting emergency network. Installing the exemplary power supply system may require little or no new wiring. Power may be supplied to one or more wire pairs at the hub or elsewhere along the network. Power from the network may be used directly by an end unit and/or to charge a battery.

In the example of FIG. 6, power may be supplied 665 at the central hub. The power may come from the municipal power supply. Additionally or alternatively, a local generator may supply emergency power. Optionally power may be supplied as an alternating current and an end unit may include a rectifier. Alternatively or additionally, power may be supplied over the network as direct current.

An end unit may include an optional integral battery. Optionally, multiple units may function simultaneous using a small power supply. The power supply may not be powerful enough to run all of the units simultaneously. The power supply may slowly recharge 666 the batteries. Optionally, batteries may allow continuous operation in the event of power outages and/or even long-term black outs.

Details of an Exemplary Embodiment of an End Unit

FIG. 7 is a circuit diagram of an exemplary embodiment of an end unit 742. Exemplary end unit 742 is a full repeater unit including both a wireless receiver 760 and a wireless transmitter 761. Communication to and from a network controller is over a pair of wires 748 from a preexisting wired network. Alternatively or additionally, an end unit may include only a receiver or only a transmitter.

In some embodiments, power may be supplied to an end unit via the preexisting wired network. For example, in exemplary end unit 742, DC power is supplied over wires 748 and harvested by a battery charger 770 to charge batteries for powering end unit 742.

Coded signals are sent and received over wires 748 via an optional analogue front end AFE 752. In some embodiments, AFE 752 may include a modem.

Optionally, radio frequency signals may be transferred between the AFE 752 and receiver 760 and/or transmitter 761 over a carrier operated relay 772. An optional CW ID 776 sends identification signals according to legal standards. An optional ID timer 774 is used to ensure that ID signals are sent within the maximum time interval.

In some embodiments, incoming and outgoing signals may be sorted by a duplexer 778, which may be connected to an antenna 780 for communication with wireless transceivers.

Details of an Exemplary Embodiment of a Communication Hub

FIG. 8 is a block diagram of an exemplary embodiment of a communication hub for controlling a radio repeater system over an existing wired emergency communication network.

In some embodiments, pairs of wires from the preexisting wired emergency network may be connected to respective AFE's 852a-c. Optionally, AFE's 852a-c pass messages back and forth with a communication controller 854. Optionally a generator 870 supplies power to controller 854 and a user interface 856. In some embodiments, power supply 870 may also power end units via wires of the preexisting network. Optionally, inductors 871$a,b$ smooth the power output of generator 870 (for example when the power is supplied as direct current DC).

An Exemplary Method of Concurrent Simplex Repeating

Figure 9:
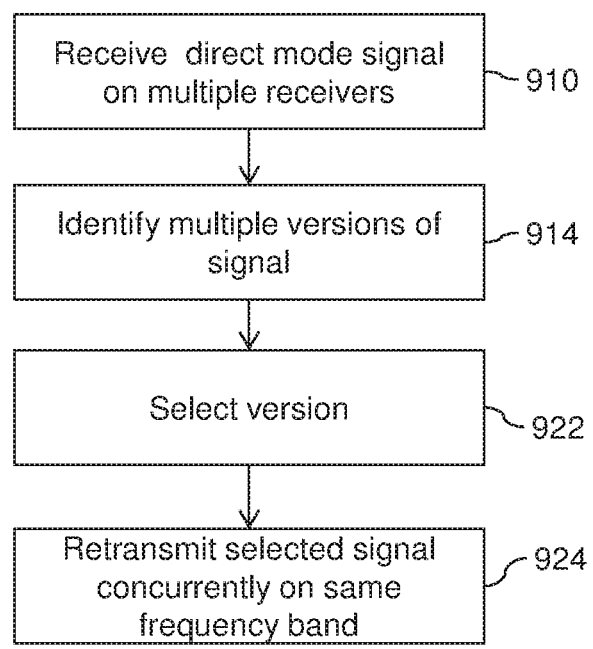
FIG. 9 is a flow chart of an exemplary embodiment of a method of simplex repeating.
Figure 10:
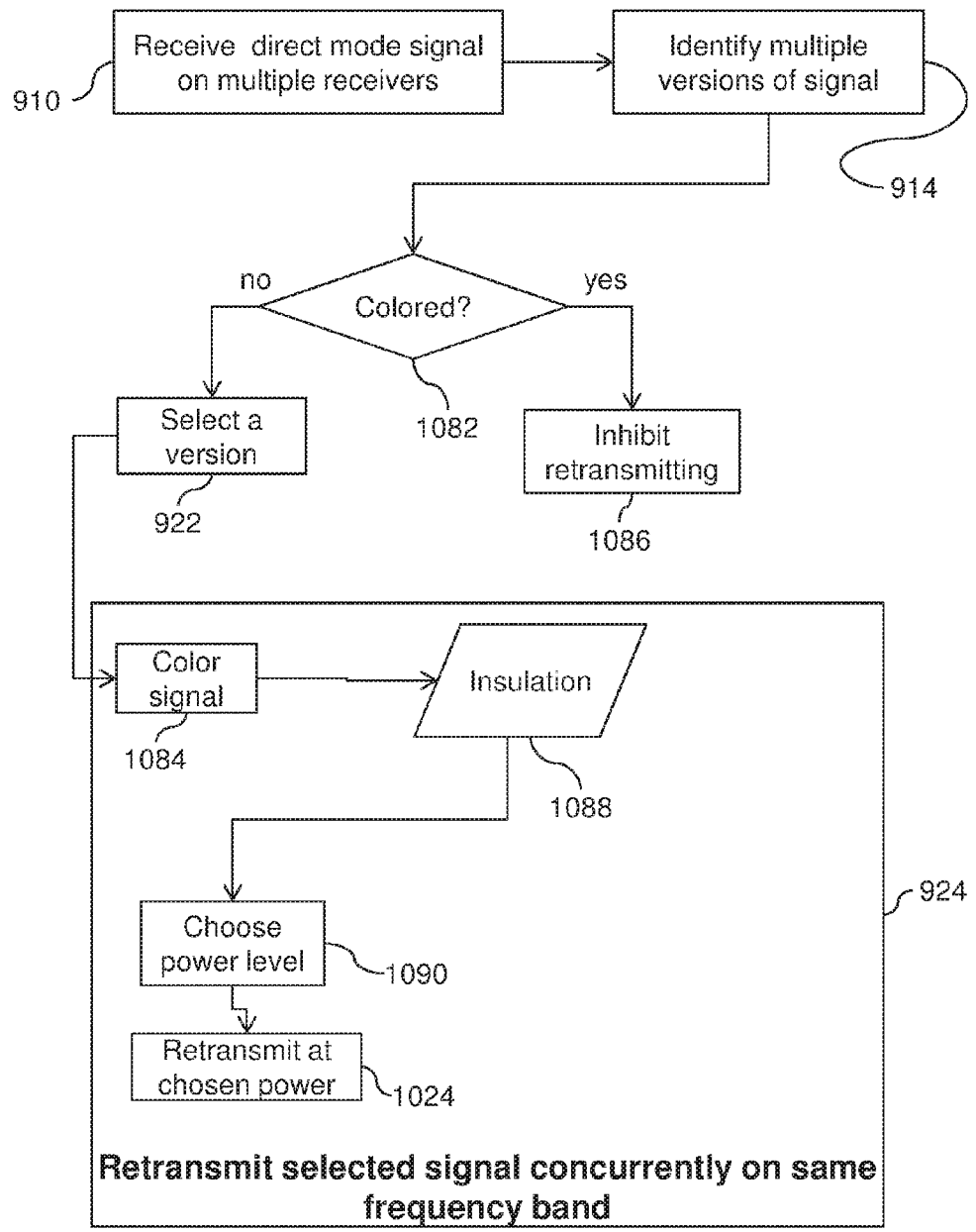
FIG. 10 is a flow chart of an exemplary embodiment of a method of simplex repeating showing additional features.

FIG. 9 illustrates an exemplary embodiment of a method of concurrent simplex repeating. In some cases, first responders may employ direct mode simplex communications. Optionally, multiple wireless receivers may be used to supply direct mode simplex coverage to various locations in an area having obstacles to radio communication. In some embodiments, the coverage areas of the receivers may overlap. A selected version from multiple versions of a received signal may, for example, be retransmitted back into the coverage area on the same simplex band as the source signal and concurrent to the source signal.

In some cases, multiple receivers receiving 910 a single direct mode signal on a simplex band may relay multiple versions of the signal to a network controller. Optionally the receivers will also forward telemetry data to the controller. Optionally, the controller may identify 914 that it has received multiple versions of a single signal. Optionally, the controller may select 922 a version of the signal and retransmit 924 it on the simplex band. Optionally, retransmitting 924, may occur while the portable transceiver is still transmitting the original signal on the simplex band. Optionally, a retransmitted signal may preserve and/or modify the identification and/or header and/or footer data of the original signal.

Exemplary Methods for Reducing Interference

In some embodiments, a repeated direct mode signal may interfere with a concurrently transmitted source signal. Another problem that may sometimes occur when a repeater is receiving and transmitting on the same simplex channel is positive feedback; a repeater may end up repeating the retransmitted signal or associated noise. Optionally, a method of repeating a direct mode signal on a simplex band may include strategies to reduce interference and/or positive feedback.

In some embodiments, signal coloring may be used to reduce positive feedback. For example, before retransmitting a signal, a coloring may be added 1084. For example, a side tone and/or subcarrier coloring may be used. Optionally, a source signal from a portable transceiver may have no coloring. Before retransmitting a signal, the signal may be checked 1082 for coloring. Lack of coloring may indicate an original signal to retransmit 924. Coloring may indicate that the signal is a previously retransmitted signal and that retransmission should be inhibited 1086 in order to avoid feedback.

Optionally, coloring may include a code to identify a transmitter and/or location. In some embodiments, a subcarrier signal and/or a side tone may be used to indicate that a signal should be retransmitted in a particularly part of the network. For example, in a case where some transmitters lack direct connection to the controller, a signal may be retransmitted in one portion of the network with, for example, a characteristic side tone which indicates that the retransmitted signal should not be retransmitted again in the same section of the network, but should be retransmitted in another part of the network.

In some embodiments, a power level of retransmission 1024 may be established 1090 to avoid interference. Typically, the power of retransmission will be less than the power of a typical portable transceiver using the system. For example, if a typically portable transceiver transmits at of power of 5 W, then the retransmission power may be established 1090 as less than 0.1 W or even less than 0.01 W. Alternatively and/or additionally, the chosen retransmitting power may optionally range between 5 and 50 Db less that the source signal.

In some embodiments, a controller may be programmed to establish 1090 a power level of retransmission depending on the insulation 1088 between a network transmitter and a network receiver. For example, when there is little insulation 1088 between a transmitter and the selected receiver of the source signal, the power of retransmission may be reduced. Insulation between a receiver and a transmitter may be due to distance (increasing distance may increase insulation) and/or due to interviewing obstacles and/or engineered. An example of engineered insulation includes having a directional antenna directed away from the receiver.

Examples of Simplex Repeater Networks—Simple System Coaxial Antennas

In some embodiments of a simplex repeater network, interference of a source signal by a retransmitted signal may be reduced by positioning of antennas. For example, antennas may be positioned such that attenuation between a source signal and a network receiver is less than attenuation between the receiver and the retransmission antenna.

Figure 11:
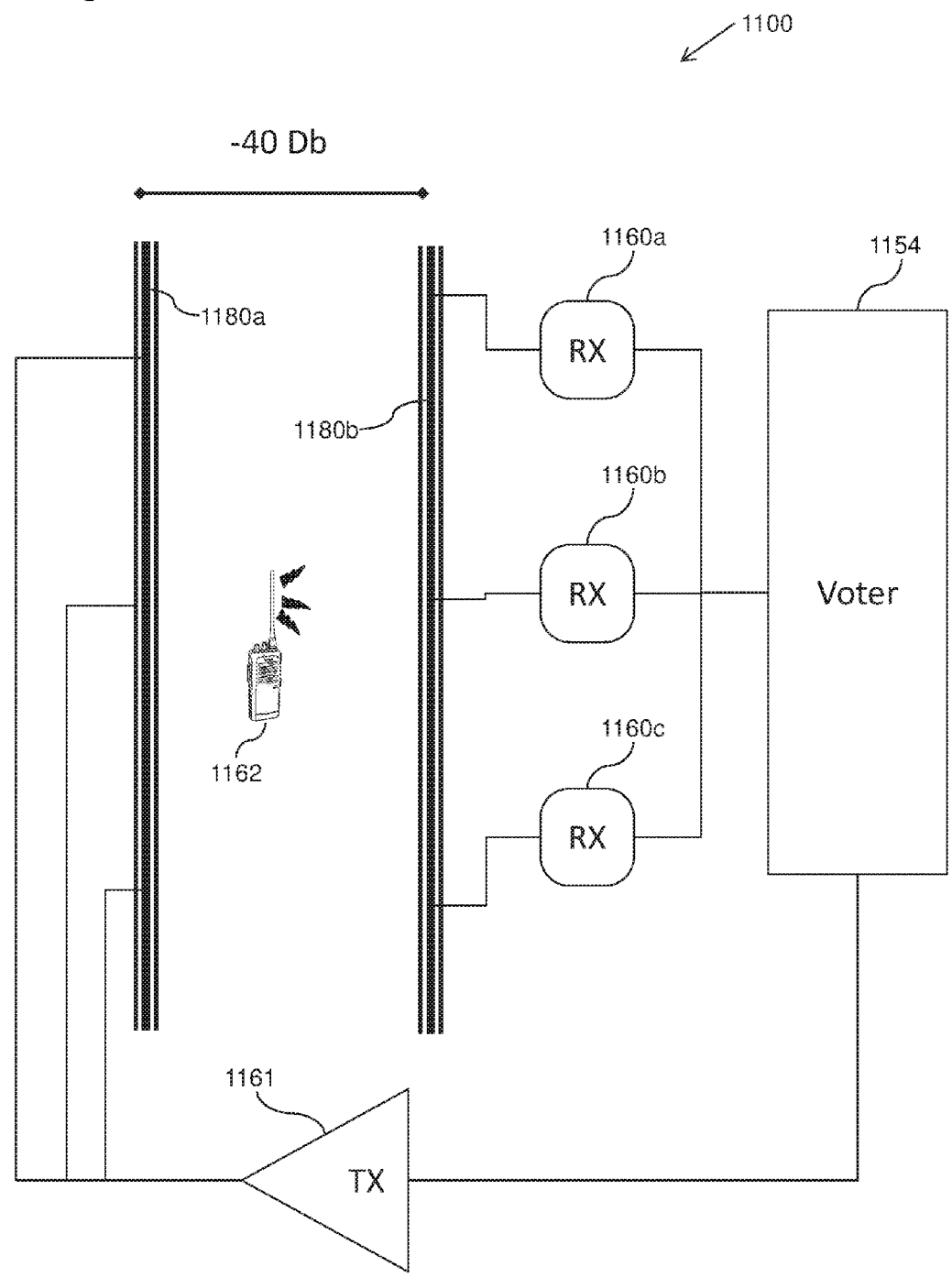
FIG. 11 is a block diagram of an exemplary embodiment of a simplex repeater network.

For example in an embodiment 1100 of FIG. 11, two leaky coaxial cables may be strung along the length of a tunnel to serve as a retransmission antenna 1180$a$ and a receive antenna 1180$b$. In the example of embodiment 1100, a portable transceiver located anywhere in the domain is within a few tens of meters of both retransmission antenna 1180$a$ and receive antenna 1180$b$. Optionally, feedback and interference between the retransmitted signal and the source signal may be reduced by insulating retransmission antenna 1180$a$ from receiving antenna 1180$b$. For example, receive antenna 1180$b$ may be on the opposite side of a tunnel from retransmission antenna 1180$a$. The attenuation of the signal between the two antennas may be, for example, between 5 and 50 decibels. Alternatively or additionally, the attenuation may be between 30 and 150 decibels.

In some embodiments, the domain may be more complex than embodiment 1100. For example, the domain may include a system of tunnels or mines. Optionally reception and/or retransmission antennas may be spread through the domain. For example, multiple antennas may be located in various locations around the domain. For example, multiple leaky coaxial cables may be connected by junctions and strung throughout the domain.

Optionally, almost all of the domain may be within a few tens of meters of the antenna. A retransmitted signal may reach most of the domain with little attenuation. In the example of embodiment 1100, even a low power retransmitted signal reaches the majority of the domain.

In the example of embodiment 1100, a portable direct mode 1162 transceiver is transmitting at 5 W power. The signal may optionally be picked up on antenna 1180$b$ by receivers 1160$a$, 1160$b$ and 1160$c$. In the example, receiver 1160$b$ is connected to antenna 1180$b$ closest to transceiver 1162.

In embodiment 1100, a voter 1154 selects the signal of receiver 1160$b$ and sends it to transmitter 1161. Optionally, a voter (for example voters 1154 and 1254) may be embodied as a separate element and/or may be embodied within a network controller via hardware and/or software.

In some embodiments, a single transmitter 1161 retransmits the selected signal all along the tunnel by injecting the signal at various points along antenna 1180a. The power of the retransmission is low, for example 0.010 W. On the one hand, the power is strong enough to be picked up by transceivers close to antenna 1180a throughout the tunnel. On the other hand, the retransmitted signal is much weaker than the source signal at the selected receiver 1160b. According to the capture effect, the weak retransmitted signal will cause minimal interference to the strong source signal in the vicinity of the selected receiver 1160b. In parts of the tunnel far from the source transceiver, the source signal may be strongly attenuated. The attenuated signal may not interfere with reception of the retransmitted signal. Voter 1154 is configured to inhibit retransmission of signals having power less than 0.010 watts.

Examples of Simplex Repeater Networks—System with Signal Coloring

FIG. 12 is a block diagram illustration of another exemplary embodiment 1200 of a simplex repeater network. In embodiment 1200 positive feedback of retransmitted signals is reduced by coloring a retransmitted signal and inhibiting further retransmission the colored signal.

Embodiment 1200 is similar to embodiment 1100. In contrast to embodiment 1100, exemplary embodiment 1200 does not use a coaxial cable as a transmit antenna. Embodiment 1200 includes three retransmit antennas 1280a, 1280b and 1280c connected to a single transmitter 1161. Exemplary embodiment 1200 does not use a coaxial cable as a receiver antenna but rather separate receive antennas 1280d, 1280e and 1280f each connected to a respective receiver 1160a-c.

Embodiment 1200 includes a coloring circuit 1292. Circuit 1292 adds a coded side band tone to retransmitted signals.

Voter 1254 of exemplary embodiment 1200 differs from voter 1154 at least in that voter 1254 is configured to detect a coloring of a signal. When voter 1254 detects a colored side band with the coded coloring produced by circuit 1292 in a signal, voter 1254 inhibits retransmission of that signal.

Example of a Simplex Radio Repeater Systems Using a Preexisting Wired Network

FIG. 13 is a block diagram illustration of an exemplary embodiment 1300 of a simplex radio repeater system communicating over an existing wired emergency network.

Exemplary embodiment 1300 includes a simplex repeater network with receivers similar to those of embodiment 1100 built into end units 1342a, 1342b and 1342c. In exemplary embodiment 1300, end units 1342a-c communicate with a voter 1254 (similar to the voter of embodiment 1200) via pairs of twisted wires, adapters and a hub interface 1352 similar to embodiment 300.

Exemplary embodiment 1300 includes three transmitters, transmitting on the same simplex band as direct mode portable transceiver 1162. Optionally, unlike embodiments 1100 and 1200, embodiment 1300 includes three separate transmitters installed in end units 1342d, 1342e and 1342f. Retransmissions on receivers 1342d-f are synchronized similarly to embodiments 400 and 500. A network controller may include hardware and/or software 1394 to administer synchronization.

In the example of FIG. 14, portable transceiver 1162 transmits a source signal at a power of 5 W. The source signal is picked up by the receivers of end units 1342b and 1342c. For example, Voter 1254 selects the version of end unit 1342c. Transmitter 1342d, which is far from the selected receiver 1342c, retransmits the colored retransmission signal at 0.20 W. In the example, a network controller is programmed to inhibit retransmission near the source signal. For example, the transmitters of end units 1342e,f, which are close to selected receiver 1342c, both transmit the colored retransmission signal at a reduced power of 0.10 W. Alternatively or additionally, a transmitter in the vicinity of a source signal may be prevented from retransmitting the signal altogether.

In exemplary embodiment 1300, transmitters and receivers are spaced on separate floors of building 1366. The optional ceiling/floor separation between receivers and transmitters increases the attenuation between the network transmitters and receivers. Increased attenuation may reduce problems of interference between the retransmitted signal and the original signal of portable transceiver 1162. Increased attenuation may also reduce the problem of feedback. Alternatively or additionally, a network transmitter could be supplied with an antenna spread around one or more floors of the building (for example a coaxial cable running around the floor). The network transmitter may then transmit at a lower power. Alternatively or additionally, in some embodiments network receivers and transmitter may both be on a single floor. Optionally a barrier may be located between them and/or an engineered source of signal attenuation.

In some embodiments, one or more floors of a building may be without an end unit.

In some embodiments, a more precise estimate may be made of the location of a portable transceiver for example by triangulation. Optionally, the estimated location of troops may be made available to a dispatcher and/or other personnel. This information may be useful for logistical reasons and/or for more precise adjusting of retransmission signals to avoid interference with the source signal and/or for search and rescue missions.

Additional Features of Some Embodiments

Some embodiments of a radio repeater system may include location estimation. For example, voting results may be used to evaluate the location of a transmitter in the domain of the system. Optionally, triangulation may be employed in the location estimation.

In some embodiments, additional redundant connections may exist between elements of a radio repeater network. For example, in addition to connections via a preexisting wired emergency communication network, an end unit may also be capable of communicating with a network controller over another preexisting medium; for example a power grid (power lines), a phone line, a cable TV line and/or a satellite network (for example a Cable TV network), and/or intercom lines. Additionally or alternatively, an end unit may be capable of communicating with a network controller over an additional dedicated channel; for example a dedicated wireless network and/or a dedicated cable. Optionally, redundant communication channels may prevent system failure in case of failure of a single part.

Some embodiments may include wireless connections between elements of a radio repeater network. A wireless connection may include for example a cellular network, a dedicated MESH configuration, and/or other existing wireless networks such as WIMAX and/or WWI.

In some embodiments, a wireless radio network may integrate voice and data communications. For example, when a commander receives a message from a particular emergency responder, he may also receive further data. For example, further data may include a unique ID of the responder, the location of the responder (the location may be supplied for example by an inertial system and/or a GPS device associated with the responder and/or via triangulation), and/or sensor data such as oxygen level, pulse, environmental conditions etc.

In some embodiments, a radio repeater system may be integrated with other systems. For example, the radio repeater system may be integrated with a fire detection system, which detects the location of, for example, smoke and/or heat. Optionally, the radio repeater system may transmit information from the other system to emergency personnel in real time. For example, sensor information may be passed to firefighters in the building, to firefighters in the vicinity of the sensor and/or to a remote dispatcher. The information may be presented, for example, in audio and/or visual format. Alternatively or additionally, a radio repeater network may be integrated with a public address system. For example, a firefighter and or a commander may use a portable radio transceiver to make announcements over a public address system. In some embodiments, integration may enable emergency personnel to use standard equipment and/or procedures to access existing proprietary resources at the site.

In some embodiments, a radio repeater system may include video capacity. For example, wireless video signals from a video camera mounted on firefighter's helmet may be relayed by the end unit selected by voting when receiving an audio signal from a handset of the same firefighter. Optionally video images may be displayed to a commander on request and/or automatically for example when receiving a call from the firefighter.

In some embodiments, a radio repeater network may support trunking, for example smartnet, smart zone, P25, TETRA, and/or TETRAPOL. Optionally, the radio repeater system may monitor and decoding a trunking control channel in real time. Optionally the radio repeater network may include a scanner to scan the control channel. For example, the control channel data may be used to determine which crew member is transmitting and/or what kind of call needs to be executed (for example, grouping, dispatch, private call, telephone interconnect call, direct mode operation, repeating mode). Optionally, based on the source of a call and/or the format and/or the destination of the call, the radio repeater system may set interoperability routes. Optionally, a call may be routed to various units on different frequencies. Optionally, a call may be routed through an external switching system, for example a remote base station. Optionally the trunked signal may be transmitted to units outside of the domain of the radio repeating system and/or a remote base station may route transmissions through the radio repeater network to units in the domain of the radio repeater network.

Some embodiments of a radio repeater system may include interoperability functionality. For example, the system may facilitate communication between different forces using different frequencies and/or different technologies (for example simplex, repeating, trunking, duplex). Optionally, interconnections may be according to logic defined in advance and/or by intervention of a commander (for example an operator controlling the communication hub). Optionally, interconnections may include connection between a portable transceiver and a landline, a cellular phone, Internet, a voice over Internet protocol (VOIP) network and/or another network.

In some embodiments, a radio repeater network may include functions that can be accessed using a keypad of a portable radio transceiver. Optionally access to predefined functions may be by Dual-tone multi-frequency signaling (DTMF). For example, a particular tone combination may be used to link to a particular person or group. For example, another tone combination may be used to broadcast a distress signal etc.

In some embodiments, a radio repeater network may be integrated to other networks. For example, an emergency responder may use the radio repeater network to send an alert to mobile phones of local residents, for example by short messaging (SMS) or by direct cell broadcast CB.

Caveats

It is expected that during the life of a patent maturing from this application many relevant technologies will be developed and the scope of the terms is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. A wireless emergency band communication repeater system for repeating a signal from a first portable transceiver to a second portable transceiver in a building comprising:
   a plurality of end units located on a plurality of floors of the building; at least two of said plurality of end units including
      a respective antenna operative to receive the signal transmitted by the first portable transceiver in a first wireless emergency audio band and
      a front end operative to transfer a respective version of said signal and telemetry data about said respective version, and
   a communication hub including
      a network connection to each of said plurality of end units,
      a controller communicating over said network connection for receiving at least two of said respective versions of said signal including at least one respective version from each of said plurality of end units, said controller operative to process said at least two respective versions and said respective telemetry data to output a single version of said signal, and
      a first network transmitter operative for receiving said single version from said controller and retransmitting said single version of said signal wirelessly to the second portable wireless transceiver.

2. The wireless emergency band communication repeater system of claim 1, wherein said network connection includes a fire resistant wire connecting at least one end unit of said plurality of end units to said communication hub and wherein at least one said respective version is transmitted to said communication hub over said fire resistant wire.

3. The wireless emergency band communication repeater system of claim 2, further comprising:
   a power source supplying power over said fire resistant wire, and said at least one end unit for receiving power from said power source and communicating with said hub over said fire resistant wire.

4. The wireless emergency band communication repeater system of claim 2, wherein said first network transmitter and at least one said respective antenna communicate with said controller over said fire resistant wire.

5. The wireless emergency band communication repeater system of claim 1, wherein said network connection includes a further wireless connection between at least one end unit of said plurality of end units to said communication hub and wherein at least one said respective version is transmitted to said communication hub over said further wireless connection.

6. The wireless emergency band communication repeater system of claim 1, wherein said controller is further configured for determining a location of said first portable transceiver within the building.

7. The wireless emergency band communication repeater system of claim 6, wherein said at least two end units are on a single floor of said building and wherein said determining includes determining a portion of said floor wherein said portable transmitter is located.

8. The wireless emergency band communication repeater system of claim 6, wherein said at least two end units are operative to collect the telemetry data and communicate said telemetry data to said controller over said network connection, said controller operative to analyze said telemetry data to determine said location.

9. The wireless emergency band communication repeater system of claim 1, further comprising:
   a second network transmitter receiving said single version from said controller and retransmitting said single version of said signal synchronized with said first network transmitter.

10. The wireless emergency band communication repeater system of claim 1, wherein each said respective antenna is designed to receive at least one wireless signal from the group consisting of a conventional mode radio signal, video signal, a Wi-Fi signal, a wireless local area network signal, a trunked mode signal, a P25 standard signal, a TETRA standard signal, a digital signal and a Mayday signal.

11. The wireless emergency band communication repeater system of claim 1, where said controller is configured for identifying said respective versions of said signal from data received from multiple antennas.

12. The system of claim 1 wherein said telemetry data includes a value for at least one parameter selected from the group consisting of signal level, received signal strength indicator (RSSI), distortion, receiver limited voltage, signal to noise ratio (SNR), signal to noise and distortion (SINAD) ratio, and signal delay.

13. The wireless emergency band communication repeater system of claim 1, wherein, said retransmitting is over at least one band selected from said emergency audio band and a different emergency audio band.

14. A method of repeating an emergency wireless communication signal sent from a first portable transceiver to a second portable transceiver in a building comprising:
   receiving a signal transmitted by the first portable transceiver in an emergency audio band with a plurality of antennas;
   relaying from each of said plurality of antennas a respective version of said signal and telemetry data about said respective version of said signal to a controller over a network connection;
   recognizing by said controller a plurality of versions of said signal, said plurality of versions including each said respective version;
   processing, by said controller, said plurality of versions and said telemetry data to output a single version of the signal;
   relaying said single version and synchronization data to at least two transmitters;
   retransmitting over said at least two transmitters said single version of said signal output from said controller over an emergency wireless frequency band to at least one portable receiver inside said building; and
   synchronizing said retransmitting over said at least two transmitters.

15. The method of claim 14, wherein said network connection includes at least one fire resistant wire connecting said controller to a at least one of said plurality of antennas, the method further comprising:
   transmitting at least one said respective version to said controller over said fire resistant wire.

16. The method of claim 14, wherein said network connection includes at least one wireless connection, the method further comprising:
   transmitting at least one said respective version to said controller over said wireless connection.

17. The method of claim 14, further comprising:
   identifying at least one transmitter in proximity to a portable receiver, and
   wherein said retransmitting is to said portable receiver and said retransmitting is over said at least one transmitter only.

18. The method of claim 14, wherein said retransmitting preserves a sender identifier.

19. The method of claim 14, further comprising:
estimating a location of a source of said signal.

\* \* \* \* \*